(12) United States Patent
Cominetti et al.

(10) Patent No.: US 11,811,943 B2
(45) Date of Patent: Nov. 7, 2023

(54) VERIFICATION OF MESSAGES USING HASH CHAINING

(71) Applicants: LG Electronics Inc., Seoul (KR); UNIVERSITY OF SÃO PAULO, São Paulo (BR)

(72) Inventors: Eduardo Lopes Cominetti, Sao Paulo (BR); Marcos Vinicius M. Silva, Sao Paulo (BR); Marcos A. Simplicio, Jr., Sao Paulo (BR); Harsh Kupwade Patil, Fremont, CA (US); Jefferson E. Ricardini F. de Oliveira, Santa Clara, CA (US)

(73) Assignees: LG ELECTRONICS INC., Seoul (KR); UNIVERSITY OF SAO PAULO, Sao Paulo (BR)

( * ) Notice: Subject to any disclaimer, the term of this patent is extended or adjusted under 35 U.S.C. 154(b) by 246 days.

(21) Appl. No.: 17/219,499

(22) Filed: Mar. 31, 2021

(65) Prior Publication Data

US 2021/0314748 A1   Oct. 7, 2021

Related U.S. Application Data

(60) Provisional application No. 63/003,305, filed on Apr. 1, 2020.

(51) Int. Cl.
*H04L 29/06* (2006.01)
*H04L 9/32* (2006.01)
*H04W 4/40* (2018.01)
*H04W 12/106* (2021.01)

(52) U.S. Cl.
CPC .......... *H04L 9/3236* (2013.01); *H04L 9/3247* (2013.01); *H04W 4/40* (2018.02); *H04W 12/106* (2021.01)

(58) Field of Classification Search
CPC ... H04W 4/40; H04W 12/106; H04W 12/069; H04L 9/3236; H04L 9/3247; H04L 9/50; H04L 2209/805; H04L 2209/84; H04L 9/3263
See application file for complete search history.

(56) References Cited

U.S. PATENT DOCUMENTS

| | | | | |
|---|---|---|---|---|
| 5,944,788 A | * | 8/1999 | Krantz | G06F 13/387 709/215 |
| 6,052,068 A | * | 4/2000 | Price R-W | G07C 5/008 340/904 |
| 7,203,316 B1 | * | 4/2007 | Nolte | G06Q 20/341 380/278 |

(Continued)

FOREIGN PATENT DOCUMENTS

| | | | | |
|---|---|---|---|---|
| CN | 100456742 C | * | 1/2009 | |
| CN | 108933763 A | * | 12/2018 | H04L 29/06 |

(Continued)

*Primary Examiner* — Sher A Khan
(74) *Attorney, Agent, or Firm* — Duane Morris LLP

(57) ABSTRACT

According to some embodiments, in a Vehicular-to-Everything (V2X) communications environment where vehicles can exchange messages with other entities, including nearby vehicles and pedestrians, systems and methods are provided to implement a mechanism or technique based on hash chaining that allows a large sequence of messages from the same source to be validated by verifying a single digital signature.

13 Claims, 10 Drawing Sheets

```
INPUT: m_{[1..n]}      ▷ Sequence of n messages to be verified       ← 910
INPUT: U               ▷ Signer's public key
OUTPUT: V_{[1..n]}     ▷ Sequence having only verified messages
1: for (i ← n; i > 0; i ← i − 1) do
2:     if (m_i ≠ null and checkSig(m_i, U)) then              ← 920
3:         V_i ← m_i        ▷ message received with valid signature
4:         while (m_{i−1} ≠ null and H(m_{i−1}) = h_i) do     ← 930
5:             V_{i−1} ← m_{i−1}   ▷ Match to h_i, carried by valid m_i
6:             i = i − 1    ▷ skip message: indirectly verified
7: return V            ▷ 1 to ⌈n/2⌉ signature verifications if all valid
```

900

(56) References Cited

U.S. PATENT DOCUMENTS

| | | | | |
|---|---|---|---|---|
| 8,140,843 B2 * | 3/2012 | Holtzman | ............ | H04L 9/3273 |
| | | | | 713/156 |
| 9,491,003 B2 * | 11/2016 | Lee | ......................... | H04L 51/56 |
| 9,521,097 B2 * | 12/2016 | Tomlinson | ............. | H04L 67/01 |
| 11,445,373 B1 * | 9/2022 | O'Connor | ............. | H04L 9/3242 |
| 2004/0025018 A1 * | 2/2004 | Haas | .................... | H04W 12/106 |
| | | | | 713/168 |
| 2004/0073617 A1 * | 4/2004 | Milliken | ............... | G06F 21/562 |
| | | | | 709/224 |
| 2005/0257057 A1 * | 11/2005 | Ivanov | ................. | H04L 9/3268 |
| | | | | 713/171 |
| 2008/0189352 A1 * | 8/2008 | Mitchell | .................... | H04L 1/22 |
| | | | | 709/201 |
| 2010/0070761 A1 * | 3/2010 | Gustave | ............... | H04L 9/3297 |
| | | | | 380/277 |
| 2010/0268943 A1 * | 10/2010 | Roy-Chowdhury | ........................ | |
| | | | | H04L 9/3265 |
| | | | | 713/175 |
| 2011/0238997 A1 * | 9/2011 | Bellur | ................... | H04L 9/3242 |
| | | | | 713/168 |
| 2019/0312738 A1 * | 10/2019 | Barrett | .................... | H04L 51/18 |
| 2020/0244442 A1 * | 7/2020 | Zeh | ....................... | H04L 63/205 |
| 2021/0314748 A1 * | 10/2021 | Cominetti | ............. | H04L 9/3247 |

FOREIGN PATENT DOCUMENTS

| | | | | |
|---|---|---|---|---|
| EP | 3506144 A1 * | 7/2019 | | |
| EP | 3716526 A1 * | 9/2020 | ....... | H04L 29/06095 |
| WO | WO-03075534 A1 * | 9/2003 | ............. | G06F 21/64 |
| WO | WO-2009130190 A1 * | 10/2009 | ............. | G06F 21/46 |
| WO | WO-2017064361 A1 * | 4/2017 | ........... | G06F 21/606 |
| WO | WO-2020052335 A1 * | 3/2020 | ......... | H04L 63/0442 |

\* cited by examiner

INPUT: $m_{[1...n]}$. Sequence of $n$ messages to be verified
OUTPUT: $V_{[1...n]}$. Sequence containing only verified messages
1: for $(i \leftarrow n\,;\,i > 0\,;\,i = i - 1)$ do
2:    if $(m_i \neq$ null and checkSig$(m_i))$ then
3:        $V_i \leftarrow m_i$. message received with valid signature
4: return $V$. up to $n$ signature verifications performed

800

INPUT: $m_{[1..n]}$ ▷ Sequence of $n$ messages to be verified 910
INPUT: $U$ ▷ Signer's public key
OUTPUT: $V_{[1..n]}$ ▷ Sequence having only verified messages
1: for ($i \leftarrow n$ ; $i > 0$ ; $i \leftarrow i - 1$) do
2:    if ($m_i \neq$ null and checkSig($m_i, U$)) then    920
3:       $V_i \leftarrow m_i$ ▷ message received with valid signature
4:       while ($m_{i-1} \neq$ null and $\mathcal{H}(m_{i-1}) = h_i$) do    930
5:          $V_{i-1} \leftarrow m_{i-1}$ ▷ Match to $h_i$, carried by valid $m_i$
6:          $i = i - 1$ ▷ skip message: indirectly verified
7: return $V$ ▷ 1 to $\lceil n/2 \rceil$ signature verifications if all valid

FIG. 9

```
INPUT: m_{[1..n]}        ▷ Sequence of n messages to be verified ── 1010
OUTPUT: V_{[1..n]}       ▷ Sequence having only verified messages
 1:  M ← new Map()       ▷ Messages to verify, mapped by index
 2:  for all (m_i ≠ null) do
 3:      M.put({key : i, value : m_i})
 4:  while (M ≠ ∅) do                                                  ── 1020
 5:      m_i ← M.removeMaxKey()    ▷ Latest m to be verified           ── 1030
 6:      if (checkSig(m_i)) then   ▷ Message's signature is valid      ── 1040
 7:          Q ← new Queue(m_i)    ▷ Enqueue verified messages
 8:          while (Q ≠ ∅) do      ▷ Try some indirect verifications
 9:              m_i ← Q.Dequeue()  ── 1050
10:              V_i ← m_i                                             ── 1060
11:              for all (h_{i-j} ∈ m_i) do  ▷ Check message's hashes
12:                  if (m_{i-j} ∈ M) then   ▷ m_{i-j} not yet validated ── 1070
13:                      if (H(m_{i-j}) = h_{i-j}) then  ▷ Match to h_{i-j}, carried by valid m_i
14:                          Q.Enqueue(m_{i-j})
15:                      ▷ Remove m_{i-j} from M: it is valid (above), ── 1080
16:                      ▷ or it is invalid due to failed hash verification
17:                      M.removeKey(i - j)
18:  return V   ▷ 1 to ⌈n/(c+1)⌉ signatures verified if all valid ── 1090
```

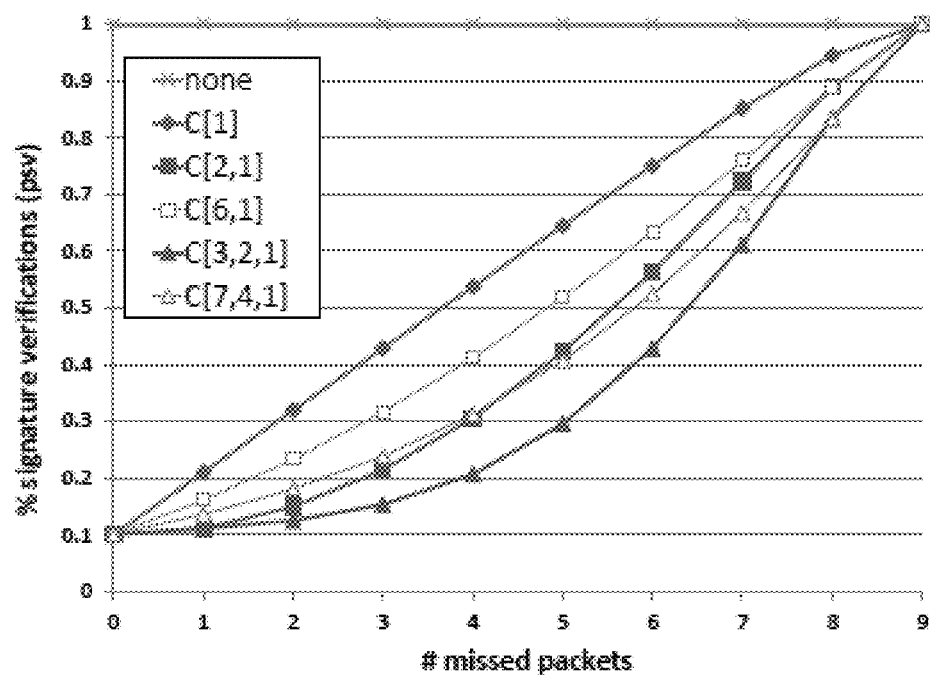
(a) $w = 10$
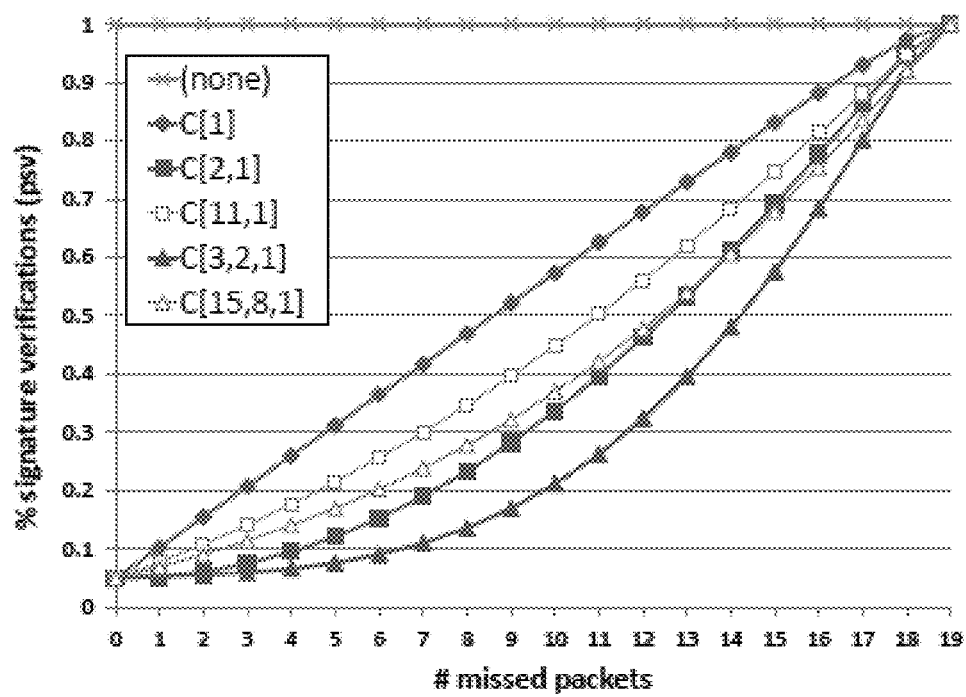
(b) $w = 20$
FIG. 11

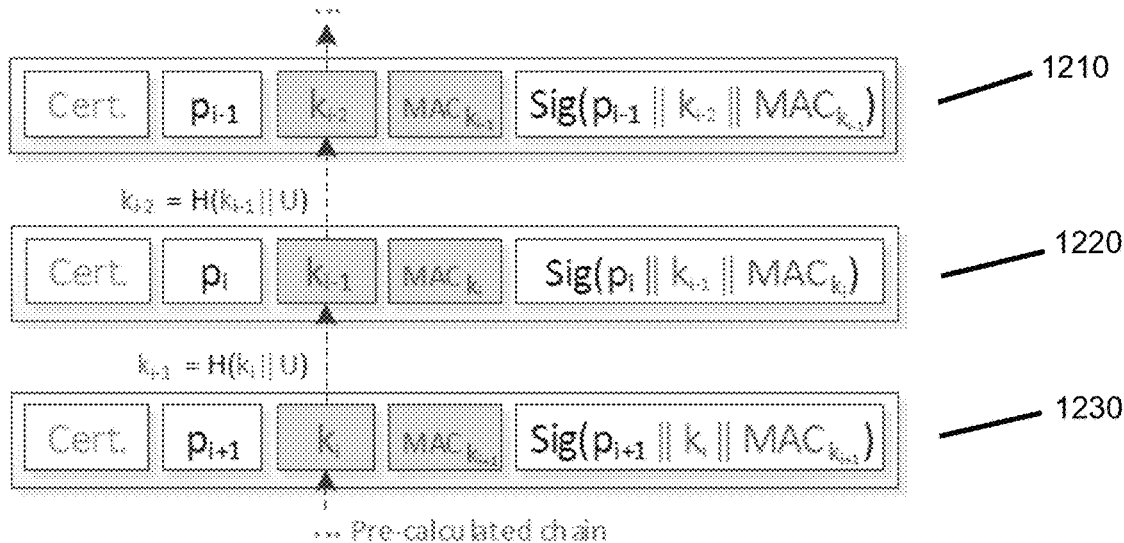

FIG. 12

```
INPUT: m_{[1..n]}     ▷ Sequence of n messages to be verified        ─── 1310
INPUT: U              ▷ Signer's public key
OUTPUT: V_{[1..n]}    ▷ Sequence having only verified messages
 1: for (i ← n ; i > 0 ; i ← i − 1) do
 2:    if m_i ≠ null and checkSig(m_i, U) then                       ─── 1320
 3:       V_i ← m_i  ;  k ← k_i
 4:       break        ▷ valid signature enables MAC computation
 5: for (i ← i − 1 ; i > 0 ; i ← i − 1) do
 6:    k ← H(k ∥ U)    ▷ MAC key for this message                    ─── 1330
 7:    if (m_i ≠ null and checkMac(m_i, k)) then
 8:       V_i ← m_i    ▷ message received with valid MAC
 9: return V            ▷ 1 signature verification if all valid
```

FIG. 13

VERIFICATION OF MESSAGES USING HASH CHAINING

CROSS REFERENCE TO RELATED APPLICATIONS

The present application claims priority to U.S. Provisional Patent Application No. 63/003,305, "FASTER VERIFICATION OF V2X MESSAGES VIA MESSAGE CHAINING," filed on Apr. 1, 2020, which is incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

The present invention relates to secure communications, including transportation-related communications among cars, trucks, trains, and possibly other vehicles, as well as pedestrians' smartphones, traffic lights, and other infrastructure, and in particular, to verification of messages using hash chaining.

BACKGROUND OF THE INVENTION

Vehicular-to-Everything (V2X) communications enable vehicles to exchange messages with other entities, including nearby vehicles and pedestrians. Hence, V2X is an essential technology for establishing an Intelligent Transportation System (ITS), where vehicles use information from their surroundings to reduce traffic congestion and increase safety.

BRIEF DESCRIPTION OF THE DRAWINGS

FIGS. 3, 3A, and 3B illustrate communications among vehicles and other equipment in the example environment, according to some embodiments.

FIG. 9 illustrates a method for message verification with simple chaining, according to some embodiments.

FIG. 10 illustrates a method for message verification with extended chaining, according to some embodiments.

FIG. 11 shows charts illustrating average percentage of signatures verified (psv) for different window sizes (w) and hash chaining configurations, according to some embodiments.

FIG. 12 illustrates an example of message verification with MACs, according to some embodiments.

FIG. 13 illustrates a method for message verification using MACs, according to some embodiments.

DETAILED DESCRIPTION OF SOME EMBODIMENTS

Figure 1:
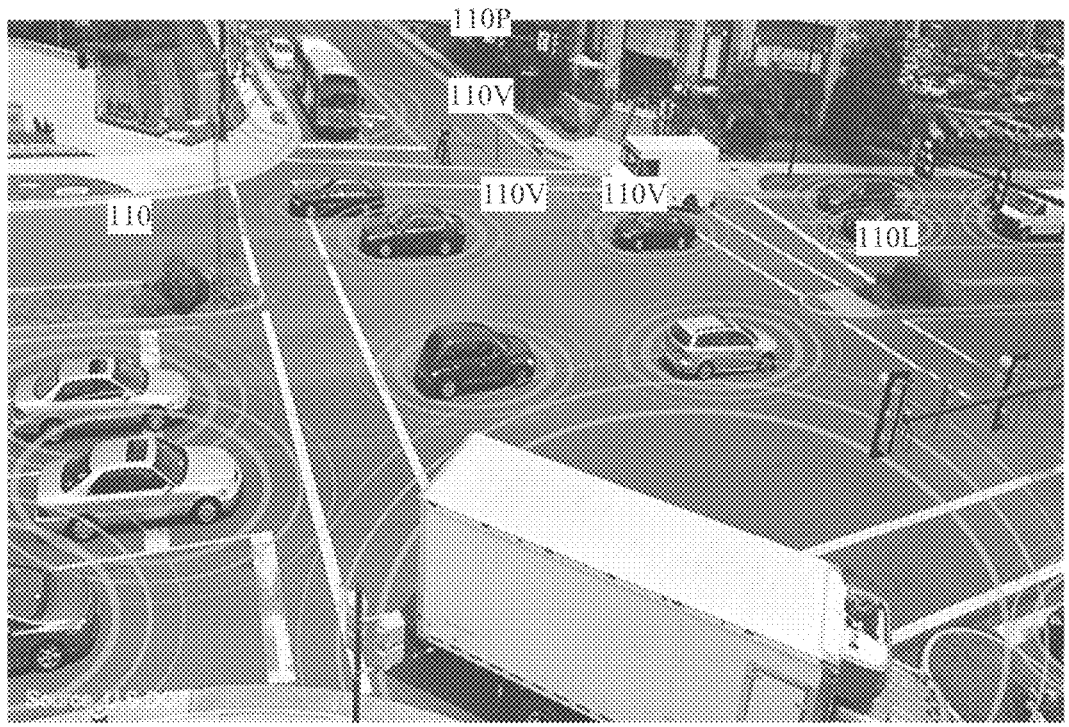
FIG. 1 illustrates an environment in which systems and methods of the present disclosure can operate.

This description and the accompanying drawings that illustrate aspects, embodiments, implementations, or applications should not be taken as limiting—the claims define the protected invention. Various mechanical, compositional, structural, electrical, and operational changes may be made without departing from the spirit and scope of this description and the claims. In some instances, well-known circuits, structures, or techniques have not been shown or described in detail as these are known to one skilled in the art. Like numbers in two or more figures represent the same or similar elements.

In this description, specific details are set forth describing some embodiments consistent with the present disclosure. Numerous specific details are set forth in order to provide a thorough understanding of the embodiments. It will be apparent to one skilled in the art, however, that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

Reducing traffic congestion and increasing safety for both vehicles and pedestrians are among the main goals of an Intelligent Transportation System (ITS). To this end, the ITS relies on Vehicular-to-Everything (V2X) communications for distributing information about road conditions (e.g., accident or speed limit notifications) and about nearby vehicles (e.g., position, speed, and direction). Given their critical nature, safety messages must be authenticated to prevent the dissemination of false information by malicious entities. This is usually accomplished by establishing a Vehicular Public Key Infrastructure (VPKI), where authorized vehicles receive valid digital certificates for signing their messages, and can be evicted/suspended from the system in case of misbehavior. Examples of prominent VPKIs are the Security Credential Management System (SCMS), which is part of the IEEE 1609.2 standard, and the Cooperative Intelligent Transport Systems (C-ITS), proposed by the European Telecommunications Standards Institute (ETSI). Both solutions provision vehicles with multiple pseudonym certificates, so long-term tracking can be avoided by each vehicle if the pseudonym employed when signing its messages is periodically changed.

To avoid abuse, V2X messages are expected to be digitally signed using valid certificates. Messages sent by unauthorized entities can then be discarded, while misbehavior can be linked to their origin (e.g., so the corresponding certificates can be revoked). One challenge in this scenario is that messages must be verified shortly upon arrival (e.g., within centiseconds), albeit vehicles may receive thousands of them per second. To handle this issue, some solutions propose the adoption of prioritization or delayed-verification mechanisms, while others involve signature schemes that support batch verification. According to some embodiments, systems and methods are provided to implement a hash chaining mechanism or technique that can be used in complement to such proposals for, with a single signature verification, enabling the authentication of a sequence of messages from the same source. Analysis shows that, for some examples, the hash chaining technique can reduce the number of verified signatures in around 90% for reliable communication channels, and by more than 65% for a maximum packet loss rate of 20%.

Example Environment

In recent times, there has been a surge in digital technologies embedded in physical objects, leading to what is today known as the Internet of Things (IoT). This trend has also reached the automotive industry, which has shown a growing interest in exploring interaction models such as Vehicle-to-Vehicle (V2V), Vehicle-to-Infrastructure (V2I), and Vehicle-to-Pedestrian (V2P), collectively referred to as Vehicle-to-Everything (V2X) communications.

FIG. 1 illustrates a V2X environment in which systems and methods of the present disclosure can operate. V2X enables several applications aimed at improving transportation safety, efficiency, and human to machine interaction. For example, with V2X, vehicles can exchange or communicate information (e.g., for velocity, direction, and brake status) that can help drivers keep a safe distance from other vehicles while maintaining a suitable speed.

The V2X communications technology is a cornerstone for the development of an Intelligent Transportation System (ITS). Mobility is a major concern in any city, and deploying an ITS can make cities more efficient. ITS can be an indispensable component of smart cities, achieving traffic efficiency while minimizing traffic problems. The adoption of ITS is widely accepted and it is used in many countries today. Because of its endless possibilities, ITS has become a multidisciplinary field of connective work and therefore many organizations around the world have developed solutions to provide ITS applications to meet demand.

Indeed, the U.S. Department of Transportation has initiated a "connected vehicles" program "to test and evaluate technology that will enable cars, buses, trucks, trains, roads and other infrastructure, and our smartphones or other devices to 'talk' to one another. Cars on the highway, for example, would use short-range radio signals to communicate with each other so every vehicle on the road would be aware of where other nearby vehicles are. Drivers would receive notifications and alerts of dangerous situations, such as someone about to run a red light as they [are] nearing an intersection or an oncoming car, out of sight beyond a curve, swerving into their lane to avoid an object on the road." U.S. Department of Transportation at www.its.dot.gov/cv_basics/cv_basics_what.htm. "Connected vehicles could dramatically reduce the number of fatalities and serious injuries caused by accidents on our roads and highways. [They] also promise to increase transportation options and reduce travel times. Traffic managers will be able to control the flow of traffic more easily with the advanced communications data available and prevent or lessen developing congestion. This could have a significant impact on the environment by helping to cut fuel consumption and reduce emissions." In some embodiments, the V2X environment for an ITS can comprise or be implemented with a Security Credential Management System (SCMS) infrastructure. The SCMS was developed in cooperation with the U.S. Department of Transportation and the automotive industry.

FIG. 1 shows a busy intersection with various entities or objects, such as vehicles 110V (cars, trucks, and possibly other types, e.g., trains or bicycles), pedestrians 110P, roadside equipment 110L (e.g., traffic lights, along with hub or gateway for short and longer-range communications). Each of the objects or entities 110 (110V, 110L, 110P, etc.) carries or incorporates equipment, such as smartphones, automotive information devices, or other computing devices. Using their respective computing devices, the objects or entities 110 communicate (e.g., wirelessly) to share information, coordinate, etc. This vehicular communications technology (also denominated Vehicle-to-Everything, or V2X) is a cornerstone for the development of Intelligent Transportation Systems (ITS).

Each vehicle 110V may, for example, broadcast its location, speed, acceleration, route, direction, weather information, etc. Such broadcasts can be used to obtain advance information on traffic jams, accidents, slippery road conditions, and allow each vehicle to know where the other vehicles are, and so on. In response, vehicle recipients of such information may alert their drivers, to advise the drivers to stop, slow down, change routes, take a detour, and so on. The traffic lights can be automatically adjusted based on the traffic conditions broadcast by the vehicles and/or other objects 110.

With the emergence of the V2X communication and ITS technology, there is an inherent increase in vehicle safety, thus saving lives and fostering a safer driving experience. This technology allows vehicles to communicate with multiple devices on-the-go and when stationary, thereby introducing an entirely new set of communication infrastructure, applications, services, etc. Furthermore, it is perceived as one of the building blocks that can propel the quicker adoption of autonomous vehicles and smart cities.

Applications in ITS are broad, encompassing areas such as safety, cooperative driving, traffic optimization, among others. Although their use is not just limited to traffic congestion control and information, the introduction of information and communication technologies, especially in vehicles, is generally considered as means to achieve efficiency, safe and sustainable mobility. Specifically, collecting data from connected vehicles presents opportunities through aggregated data analysis for investigating driver behavior to vehicle manufacturers and insurers, monitoring traffic conditions to governmental agencies involved in tolling or traffic management, and to develop new services as needed.

Figure 2:
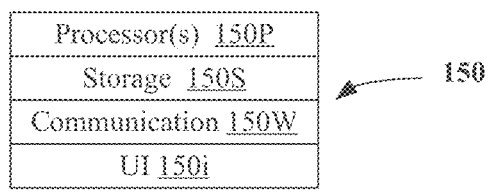
FIG. 2 is a block diagram of a computing device which can be used by any of the entities shown in FIG. 1, according to some embodiments.

FIG. 2 illustrates an embodiment of a computing device 150 which is used by the vehicles or other entities and objects, e.g., for communicating, coordinating, etc. in the environment of FIG. 1. As shown in FIG. 2, the computing device 150 includes one or more computer processors 150P coupled to computer storage (memory) 1505, and wireless communication equipment 150W for radio communications.

Operation of computing device 150 is controlled by processor 150P, which may be implemented as one or more central processing units, multi-core processors, microprocessors, microcontrollers, digital signal processors, field-programmable gate arrays (FPGAs), application-specific integrated circuits (ASICs), graphics processing units (GPUs), tensor processing units (TPUs), and/or the like in computing device 150P.

Memory 1505 may be used to store software executed by computing device 150 and/or one or more data structures used during the operation of computing device 150. Memory 1505 may include one or more types of machine-readable media. Some common forms of machine-readable media may include a floppy disk, a flexible disk, hard disk, magnetic tape, any other magnetic medium, CD-ROM, any other optical medium, punch cards, paper tape, any other physical medium with patterns of holes, RAM, PROM, EPROM, EEPROM, FLASH-EPROM, any other memory chip or cartridge, and/or any other medium from which a processor or computer is adapted to read.

Processor 150P and/or memory 1505 may be arranged in any suitable physical arrangement. In some embodiments, processor 150P and/or memory 1505 may be implemented on the same board, in the same package (e.g., system-in-package), on the same chip (e.g., system-on-chip), and/or the like. In some embodiments, processor 150P and/or memory 1505 may include distributed, virtualized, and/or containerized computing resources. Consistent with such embodiments, processor 150P and/or memory 1505 may be located in one or more data centers and/or cloud computing facilities. In some examples, memory 1505 may include non-transitory, tangible, machine-readable media that include executable code that when run by one or more processors (e.g., processor 150P) may cause the computing device 150, alone or in conjunction with other computing devices in the environment, to perform any of the methods described further herein The computing device or equipment 150 may include user interface 150i, e.g., such as present in a smartphone, an automotive information device, or of some other type device, for use by pedestrians, vehicle drivers, passengers, traffic managers, and possibly other people.

Wireless communication equipment 150W of computing device 150 may comprise or be implemented with one or more radios, chips, antennas, etc. for allowing the device 150 to send and receive signals for conveying information or data to and from other devices. Under the control of processor 150P, wireless communication equipment 150W may provide or support communication over Bluetooth, Wi-Fi (e.g., IEEE 802.11p), and/or cellular networks with 3G, 4G, or 5G support.

Figure 3A:
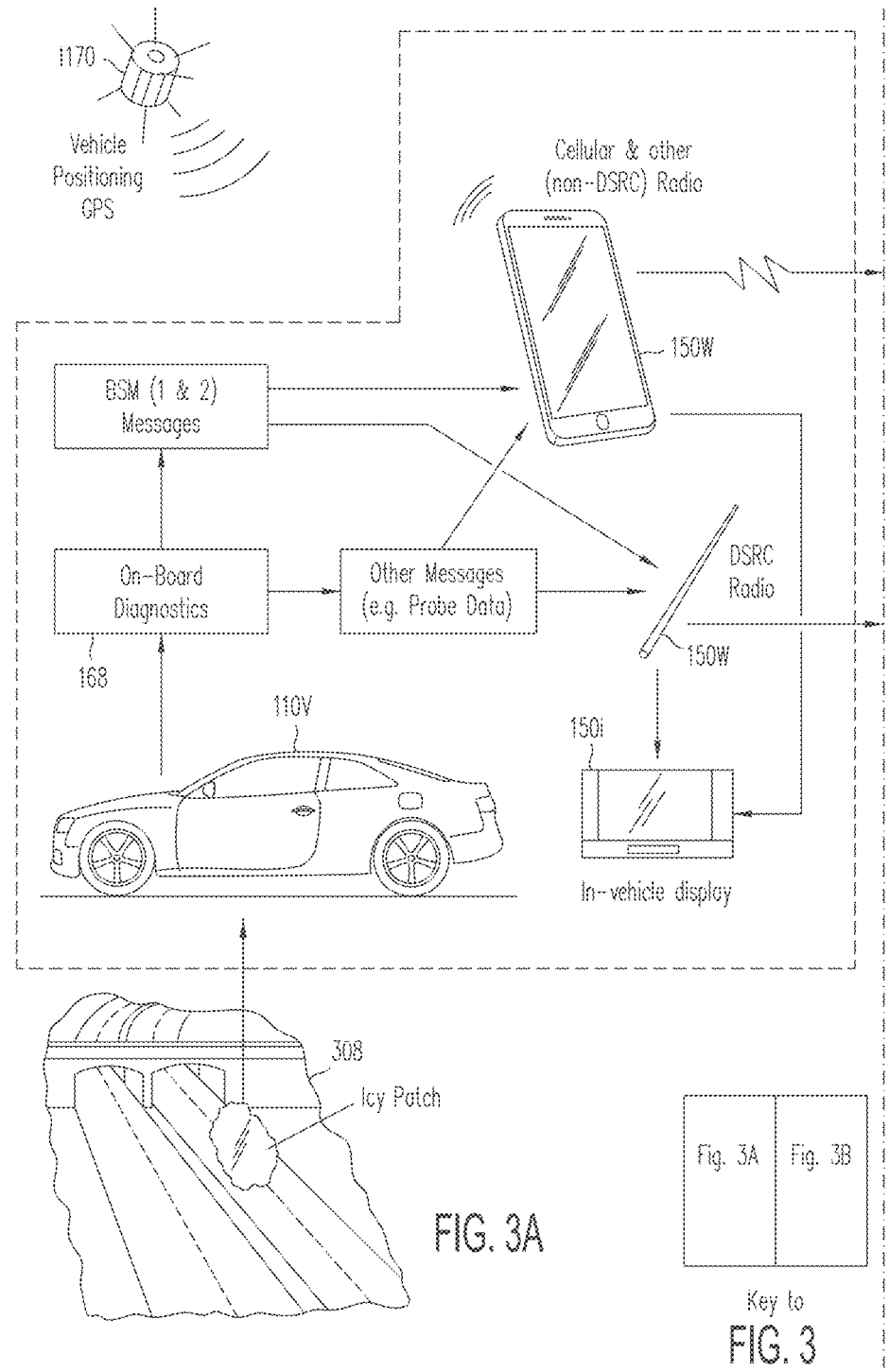
Figure 3B:
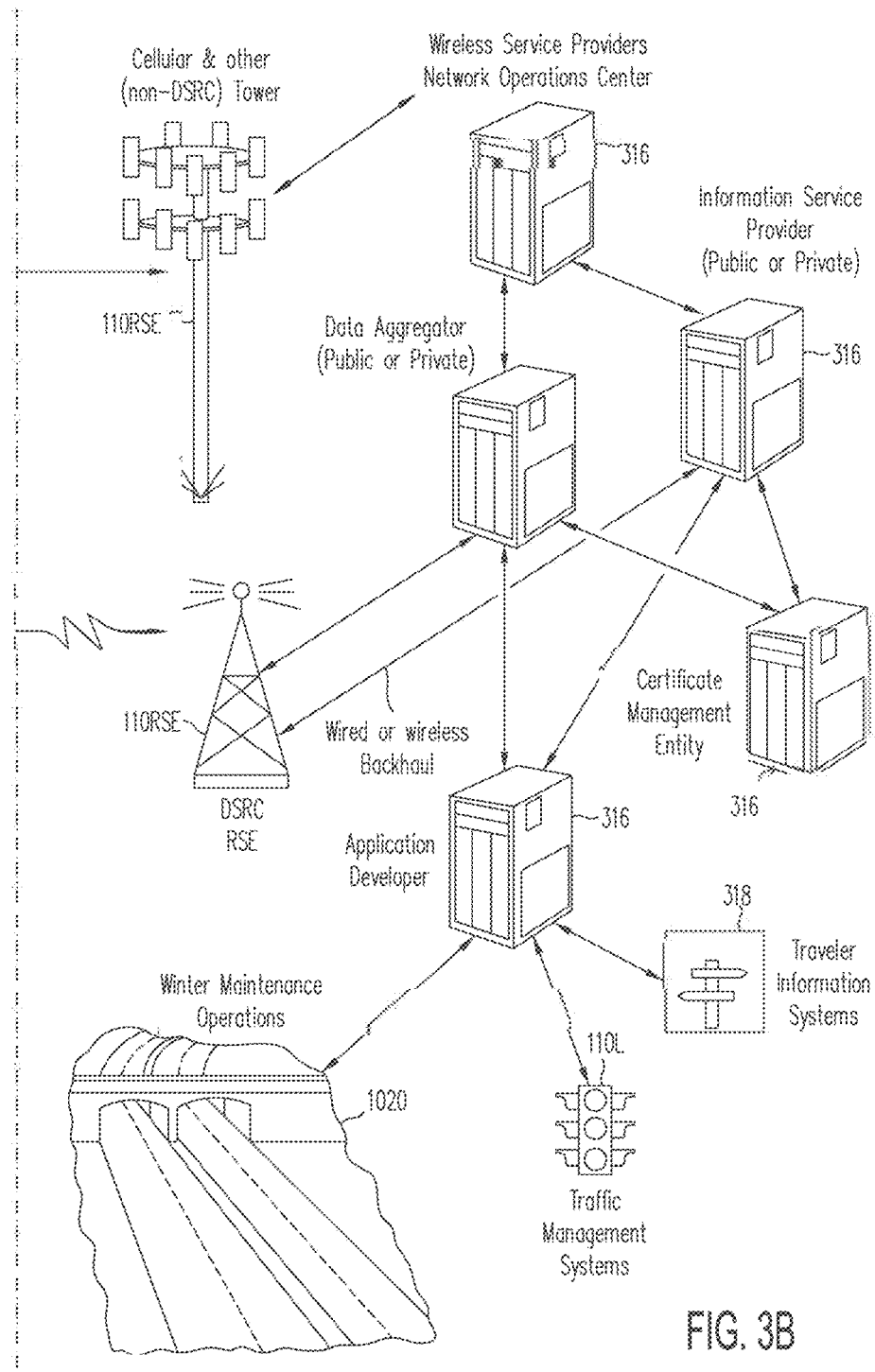

FIGS. 3, 3A, and 3B illustrate examples of communication schemes for entities or objects 110 or their computing devices 150 ("object 110," "user 110," and "equipment 150" may be used interchangeably herein when no confusion arises), interacting via V2X or connected vehicle technology. At scene 308, a vehicle 110V encounters an icy road patch.

The vehicle 110V includes On-Board Equipment (OBE) 304 with one or more sensors—such as accelerometers, brake monitors, object detectors, LIDAR, etc.—for sensing conditions within and around vehicles 110V, such as sudden braking, wheel spin, potential collisions, etc. Using these sensors, the vehicle 110V may, for example, detect the icy road patch at scene 308. The sensors supply information to the OBE's computing device or equipment 150 (FIG. 2) so that it can take action accordingly, e.g., by automatically applying brakes, adjusting steering, and/or notifying the user via a display 150i in case the user needs to react. The computing device 150 may comprise an on-board diagnostics module 168 for performing diagnostics or analysis, for example, on the information provided by the sensors.

Different pieces of equipment on the vehicle 110V communicate by exchanging Basic Safety Messages (BSM) and/or other messages with each other and other vehicles. The BSM messages are described in detail in Whyte et al., "A security credential management system for V2V communications," *IEEE Vehicular Networking Conference*, 2013, pp. 1-8, and CAMP, "Security credential management system proof-of-concept implementation—EE requirements and specifications supporting SCMS software release 1.1," *Vehicle Safety Communications Consortium, Tech. Rep.*, May 2016 (available: www.its.dot.gov/pilots/pdf/SCMS_POC_EE_Requirements.pdf), both of which are incorporated by reference.

A vehicle or other object 110 can obtain its location, for example, by using GPS satellites 1170 or cellular triangulation. The vehicle 110V may also include communication equipment 150W, which, in some embodiments, can include a Direct Short Range Communications (DSRC) radio and non-DSRC radio equipment such as a mobile phone. The vehicle may thus communicate through a cellular system or other roadside equipment (RSE) HORSE directly, i.e., without intermediate network switches. RSE may alternately be referred to as a roadside unit (RSU). In some embodiments, the RSE can be implemented with or in a base station (BS) proximate a road. An RSE may include some of the same or similar equipment as vehicle 110V, including computing devices 150, sensors, user interfaces, communication equipment, etc. The RSE may act as a gateway to other networks, e.g., the Internet. Using the communication equipment 150W, vehicle 110 can communicate BSM messages and other information to other vehicles, entities, or objects 110 in the V2X or connected vehicle environment. Thus, vehicle 110V/150 may inform the other parts of the environment or ITS of the icy patch at scene 308. Likewise, another vehicle 110 may be located in scene 1020 and may alert other vehicles of winter maintenance operations at that scene.

A traffic management system 110L may comprise equipment—e.g., stoplights, crosswalk lights, etc. located in or near roads, highways, crosswalks, etc.—to manage or control traffic of vehicles, persons, or other objects and entities. Traffic management system 110L may include some of the same or similar equipment as vehicle 110V, including computing devices 150, sensors, user interfaces, communication equipment, etc.

Computer systems 316 process, aggregate, generate or otherwise operate on information sent to or received from vehicles 110V, traffic management systems 110L, and other objects or entities 110 in the V2X or connected vehicle technology environment, along with their respective computing devices 150. Also shown is a traveler information system 318. Computer systems 316 can be implemented in or incorporate, for example, one or more servers. These computer systems 316, for example, provide or support location and map information, driving instructions, traffic alerts and warnings, information about roadside services (e.g., gas stations, restaurants, hotels, etc.). The computer systems 316 may receive information from the various vehicles, entities, and objects 110 in the environment, process and communicate information or instructions throughout the environment to manage the objects, e.g., by adjusting signaling on traffic lights, rerouting traffic, posting alerts or warnings, etc.

In some embodiments, one or more of the various objects, entities, equipment, computers, and infrastructure shown in FIGS. 3, 3A, and 3B can implement, communicate with, or support a Traffic Data Center (TDC). A TDC can be a component of an ITS, and comprises a technical system administered by a transportation authority. In some embodiments, much of the data in an ITS is collected and transmitted to a TDC, processed and analyzed for managing traffic in real-time or further operations. A vehicular urban sensor network is a network paradigm for sensing data collection in urban environments. The mobile networks formed mainly by vehicles 110V and fixed bases (e.g., base stations such as RSU or RSE) in a road infrastructure are known as Vehicular Ad Hoc Networks (VANETs). The RSE or RSU is equipment installed on the road that receives and sends messages to the TDC or vehicle equipped with an OBU, a wireless transmitter/receiver to communicate with other nodes. Each vehicle or base station acts as a node that receives and sends messages, or as a router that receives a packet and forwards it to the final recipient.

In some embodiments, the underlying technology used in VANETs can be include or encompass Dedicated Short Range Communication (DSRC)/Wireless Access in Vehicular Environment (WAVE) with radio communication provided by IEEE 802.11p and cellular networks with 3G or 4G support. A vehicle 110V periodically sends beacons to its neighbors, which contains data as identification, timestamp, position, speed (direction), acceleration, among other 7700 signals, approximately, collected by sensors of the vehicle. A beacon contains sensitive information, which may be used in many applications of interest to the industry, companies or government. One widely used application is traffic management.

This communication capability within the connected vehicle or V2X technology environment is potentially vulnerable to errors and abuse. A malicious user 110 (e.g., a vehicle operator or traffic manager) and/or defective equipment 150 may transmit false or incorrect information to other vehicles, so as to undesirably affect traffic. To protect the system from such misbehavior, the V2X communications should be authenticated, for example, using a vehicular public-key infrastructure (VPKI). VPKI solutions have been implemented in the Cooperative Intelligent Transport Systems (C-ITS), led by the European Telecommunications Standards Institute (ETSI), and the Security Credential Management System (SCMS), which is part of the IEEE 1609.2 standard. With a VPKI, each vehicle 110V or other equipment is provided with a private key (e.g., for signing a message) and a public key (e.g., for signature verification). The public key is distributed to the public, but the private key is kept secret.

VPKI issues multiple short-lived, pseudonym certificates to authorized vehicles. Each vehicle can then use its certificates to digitally sign its messages, so the authenticity of the conveyed information can be verified. A vehicle can also avoid tracking attempts by its peers if it periodically changes the pseudonym employed along the way: as a result, it should not be straightforward to link different messages to the same vehicle just by analyzing the corresponding certificates' contents.

To ensure that the messages exchanged between vehicles are legitimate, a vehicle may digitally sign each message using the vehicle's private key. The message recipient can verify the signature using the sending vehicle's public key. The public keys themselves are authenticated by means of digital certificates which certify that a given public key belongs to an authorized vehicle. The certificates are distributed by trusted computer entities called Certificate Authorities (CAs). Each certificate is signed by the CA, allowing the message recipient to confirm the certificate's authenticity by verifying the CAs signature.

Figure 4:
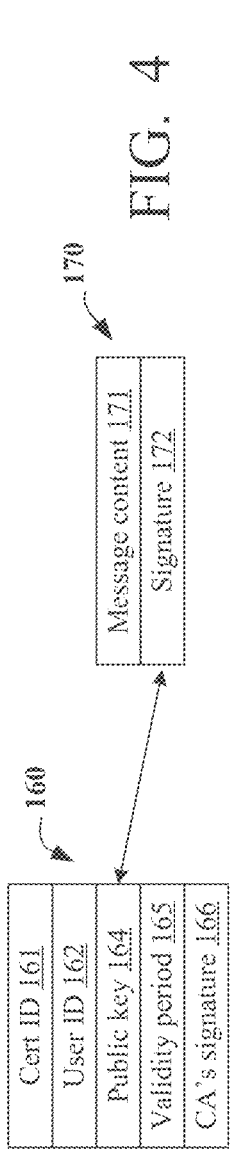
FIGS. 4, 5A, and 5B illustrate examples of digital certificates for message authentication, according to some embodiments.
Figure 5A:
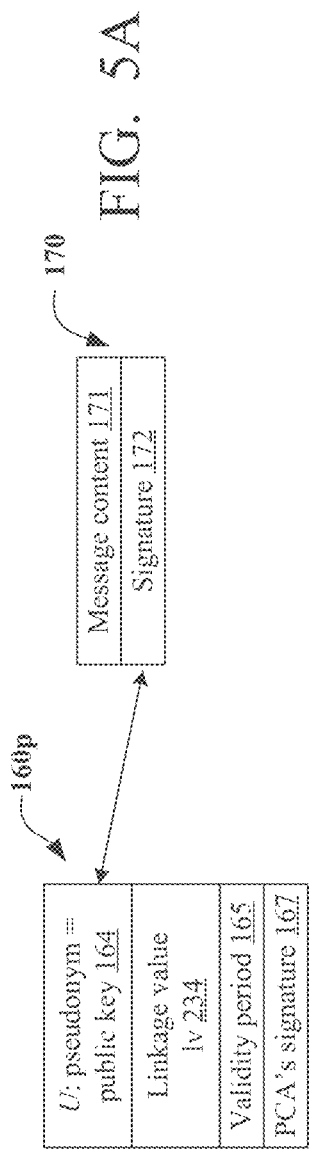
Figure 5B:
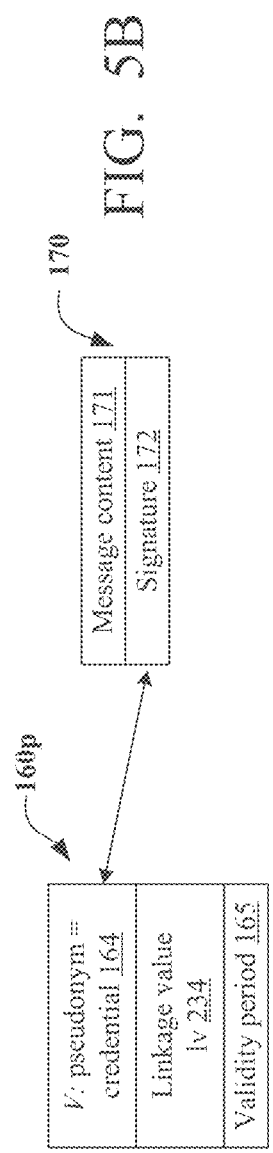

FIGS. 4, 5A, and 5B illustrate examples of digital certificates which can be used for message authentication in the connected vehicle or V2X technology environment.

Referring to FIG. 4, a digital certificate 160 is shown. Digital certificate 160 has a number of fields or parameters. In some embodiments, these include a certificate ID 161, a user ID 162 (e.g., a vehicle ID number or the user's email address), the vehicle's (or user's) public key 164, and possibly other parameters (called metadata), such as the certificate's validity period 165, an identification of the signature scheme, and maybe others. Certificate 160 also includes a signature 166 formed by a certificate authority (CA) over all the fields of the certificate except the signature itself. The CA may reside on or be implemented in computers 316 for example.

Digital certificate 160 can be issued to a vehicle 110V to authenticate the public key 164. The vehicle 110V attaches its certificate 160 to each message 170 transmitted by the vehicle. The message 170 includes message body or content 171, and a digital signature 172 generated by the vehicle using its private key. The message recipient uses the CA's public key to verify the signature 166 and thus authenticate the certificate 160 including the public key 164. The recipient then uses the public key 164 to verify the message signature 172 and thus authenticate the message. In some embodiments, the verification of the certificate's signature 166 and message signature 172 can also be combined (e.g., for better performance).

A disadvantage of a scheme or approach which uses certificates that include some form of identification (ID) is potentially compromising user privacy: if a vehicle's transmissions are intercepted, the vehicle can be tracked by tracking the certificate ID 161 or user ID 162 transmitted by the vehicle. More particularly, one important requirement of V2X and Intelligent Transportation Systems (ITS) technologies is to find an adequate balance between security and privacy: at the same time that messages exchanged between vehicles, infrastructure, pedestrians, etc. should be authenticated, dissuading misbehavior and preventing data forgery, the users' privacy should be preserved, so the system is not abused for mass surveillance purposes. This requirement calls for a privacy-preserving VPKI. In some embodiments, authorized vehicles are loaded with multiple pseudonym certificates, i.e., certificates that do not explicitly identify their owners. In some embodiments, such certificates have very small validity periods (e.g., 1 week), which may overlap (e.g., 100 certificates might be valid at the same time). Hence, vehicles can employ some strategy for rotating among pseudonyms when signing messages, thus avoiding long-term tracking.

Thus, according to some embodiments, to protect user privacy, the user can be issued multiple pseudonym certificates 160p (FIG. 5A) with random-looking strings ("pseudonyms") 164 instead of IDs 161 and 162. The vehicle then uses a pseudonym certificate instead of certificate 160 in message transmissions. The vehicle can automatically use different pseudonym certificates 160p for different messages 170 to avoid tracking.

FIG. 5A illustrates a pseudonym certificate 160p accompanying a message 170. The certificate is generated by a pseudonym certificate authority (PCA), also called authorisation certificate authority (ACA) in some embodiments. The pseudonym 164, also denoted as U, acts as both the certificate ID and the public key. The certificate 160p may include validity period 165, an identification of the signature scheme, PCA signature 167, and maybe other parameters, similarly to certificate 160 of FIG. 4. Pseudonym certificate 160p may also include linkage value (1v) 234 used for certificate revocation as described below. (The linkage values may or may not be used for some embodiments of the present invention.)

The vehicle attaches one of its pseudonym certificates 160p to each message 170 transmitted by the vehicle. The message recipient uses the PCA's public key to verify the PCA signature 167, and uses the pseudonym 164 to verify the message signature 172 and thus authenticate the message 170. In some embodiments, the verification of the certificate's signature 167 and message signature 172 can be combined (e.g., for better performance). Such pseudonym certificates are used in Security Credential Management System (SCMS) and later extended in CAMP.

FIG. 5B illustrates a variation, which may be called "implicit certificate." Instead of a public key U, the pseudonym field 164 includes "credential" data (or "public key reconstruction" data), denoted as V, allowing anyone having the PCA's public key to derive the certificate's public key U. In some embodiments, U is not stored in the certificate 160$p$. See for example "Certicom. Sec 4 v1.0: Elliptic curve Qu-Vanstone implicit certificate scheme (ECQV). Technical report, Certicom Research, 2013. http://www.secg.org/sec4-1.0.pdf, incorporated herein by reference.

When a message recipient needs to verify the message signature 172, the message recipient first reconstructs the user's public key U from the pseudonym 164 (V) and the PCA public key, and then uses the user's public key U to verify the signature. Since this process uses the PCA public key, this process not only authenticates the message 170 as coming from a user possessing the certificate 160$p$, but also verifies the certificate 160$p$ as authenticated by PCA 210. A separate PCA signature 167 is therefore unnecessary and is omitted, reducing the certificate size.

It may be desirable to reduce the computation costs and the network bandwidth in provisioning and activating the certificates. Further, the use of certificates is complicated by the need to ensure that a dishonest, or "honest but curious," certificate management entities cannot easily compromise the system even if they collude. It may be desirable to reduce the security risks presented by the certificate management entities.

Security Credential Management System (SCMS

Security Credential Management System (SCMS) is a vehicular public-key infrastructure (VPKI) design for protecting V2X—vehicle-to-vehicle (V2V) and vehicle-to-infrastructure (V2I)—communications. SCMS is described in further detail in Whyte et al., "A security credential management system for V2V communications," in IEEE Vehicular Networking Conference, 2013, pp. 1-8, and CAMP LLC, "Security Credential Management System Proof-of-Concept Implementation—EE Requirements and Specifications Supporting SCMS Software Release 1.1," May 2016; available at https://www.its.dot.gov/pilots/pdf/SCMS_POC_EE_Requirements.pdf, both of which are incorporated herein by reference. SCMS deals with revocable privacy while preventing any given certificate management entity from tracking devices 110/150 by the entity itself, i.e., without colluding with other system entities. By doing so, SCMS copes with the security needs of V2X while elegantly addressing a threat model in which the system's entities can be considered "honest-but-curious," i.e., they follow the correct protocols but may try to track vehicles if this can be done in an undetectable manner, as described in Khodaei et al., "The key to intelligent transportation: Identity and credential management in vehicular communication systems," *IEEE Vehicular Technology Magazine*, vol. 10, no. 4, pp. 63-69, December 2015, which is incorporated by reference. This is accomplished by combining (A) an efficient and privacy-preserving method for vehicles to obtain large batches of pseudonym certificates, and (B) an ancillary process for revoking the user's privacy in case of misbehavior, so multiple certificates belonging to the same user can be easily linked together.

General Notation

For convenience, the "Symbols" Table below includes a list of the symbols and general notation adopted in this disclosure for the relevant environment including V2X, connected vehicle, and/or SCMS.

TABLE

| Symbol | Meaning |
|---|---|
| U | A vehicle's public key, different for each pseudonym certificate, and used as a pseudonym, placed in pseudonym a certificate |
| u | The private key corresponding to U |
| s, S | Private and public caterpillar keys for signature |
| e, E | Private and public caterpillar keys for encryption |
| $\hat{s}, \hat{S}$ | Private and public cocoon keys for signature |
| $\hat{e}, \hat{E}$ | Private and public cocoon keys for encryption |
| x, X | Private and public unified caterpillar keys |
| $\hat{x}, \hat{X}$ | Private and public unified cocoon keys |
| β | Number of cocoon keys in a batch of pseudonym certificates generated in response to a request to generate the pseudonym certificates |
| la_id | ID of a Linkage Authority |
| l | Number of LAs (typically two) |
| $ls_i$ | Linkage seed |
| $plv_i$ | Pre-linkage value |
| σ | Number of certificates valid in each time-period |
| lv | Linkage value |
| Dec(K,str) | Decryption of bitstring str with key K |
| Sign(K,str) | Signature of bitstring str with key K |
| Verif(K,str) | Verification of signature on str with key K |
| Enc(key,str) | Encryption of a bit string str with key |
| Hash+str) | Hash of str |
| $b^n$ | Bitstring corresponding to the bit b repeated n times |
| \|str\| | The length of str, in bits |
| $str_1 \| str_2$ | Concatenation of bitstrings $str_1$ and $str_2$ |

The notation enc(key, str) denotes the encryption of a bit string str with key. An example encryption technique uses standard block ciphers such as the Advanced Encryption Standard (AES), as described in more detail in NIST, *Federal Information Processing Standard (FIPS 197)—Advanced Encryption Standard (AES)*, National Institute of Standards and Technology, U.S. Department of Commerce, Gaithersburg, Md., USA, November 2001, available: http://csrc.nist.gov/publications/fips/fips197/fips-197.pdf. Similarly, the notation hash(str) denotes the hash of str, using some standard hash function such as SHA-2 or SHA-3, as described in more detail in NIST, *Federal Information Processing Standard* (FIPS 180-4)-*Secure Hash Standard (SHS)*, National Institute of Standards and Technology, U.S. Department of Commerce, Gaithersburg, Md., USA, August 2015, D01:10.6028/NIST.FIPS.180-4, and NIST, *Federal Information Processing Standard (FIPS 202)-SHA-3 Standard: Permutation-Based Hash and Extendable-Output Functions*, National Institute of Standards and Technology, U.S. Department of Commerce, Gaithersburg, Md., USA, August 2015, DOI: 10.6028/NIST.FIPS.202, both of which are incorporated by reference herein.

The length of a given string str in bytes is denoted |str|. The generator point of an elliptic curve group (written additively) is denoted by G. In some public-key cryptographic algorithms, the private key is an integer k, and the corresponding private key is k G, as common in cryptosystems based on the elliptic curve discrete logarithm problem (ECDLP).

In SCMS, each device (110/150) receives two types of certificates: an enrollment certificate 160, which has a long expiration time T and identifies a valid device in the system; and multiple pseudonym certificates 160$p$, each having a short validity (e.g., a few days), in such a manner that σ≥1 pseudonym certificates may be valid simultaneously. For protecting its privacy, a particular vehicle may frequently change the pseudonym certificate employed in the vehicle's communications, thus avoiding tracking by nearby vehicles or by roadside units. In practice, it is useful to limit the value of a to a small number to avoid "sybil-like" attacks (as described in detail in Douceur, "The Sybil attack," Proceedings of 1st International Workshop on Peer-to-Peer Systems (IPTPS). Springer, January 2002 (Available: haps://www.microsoft.com/en-us/research/publication/the-sybil-attack/), which is incorporated herein by reference), in which one vehicle poses as a platoon aiming to gain some advantage over the system (see Moalla et al., "Risk analysis study of ITS communication architecture," 3rd International Conference and The Network of the Future, 2012, pp. 2036-2040, which is incorporated herein by reference). For example, such a fake platoon could end up receiving preferential treatment from traffic lights programmed to give higher priority to congested roads.

Example SCMS Architecture

Figure 6:
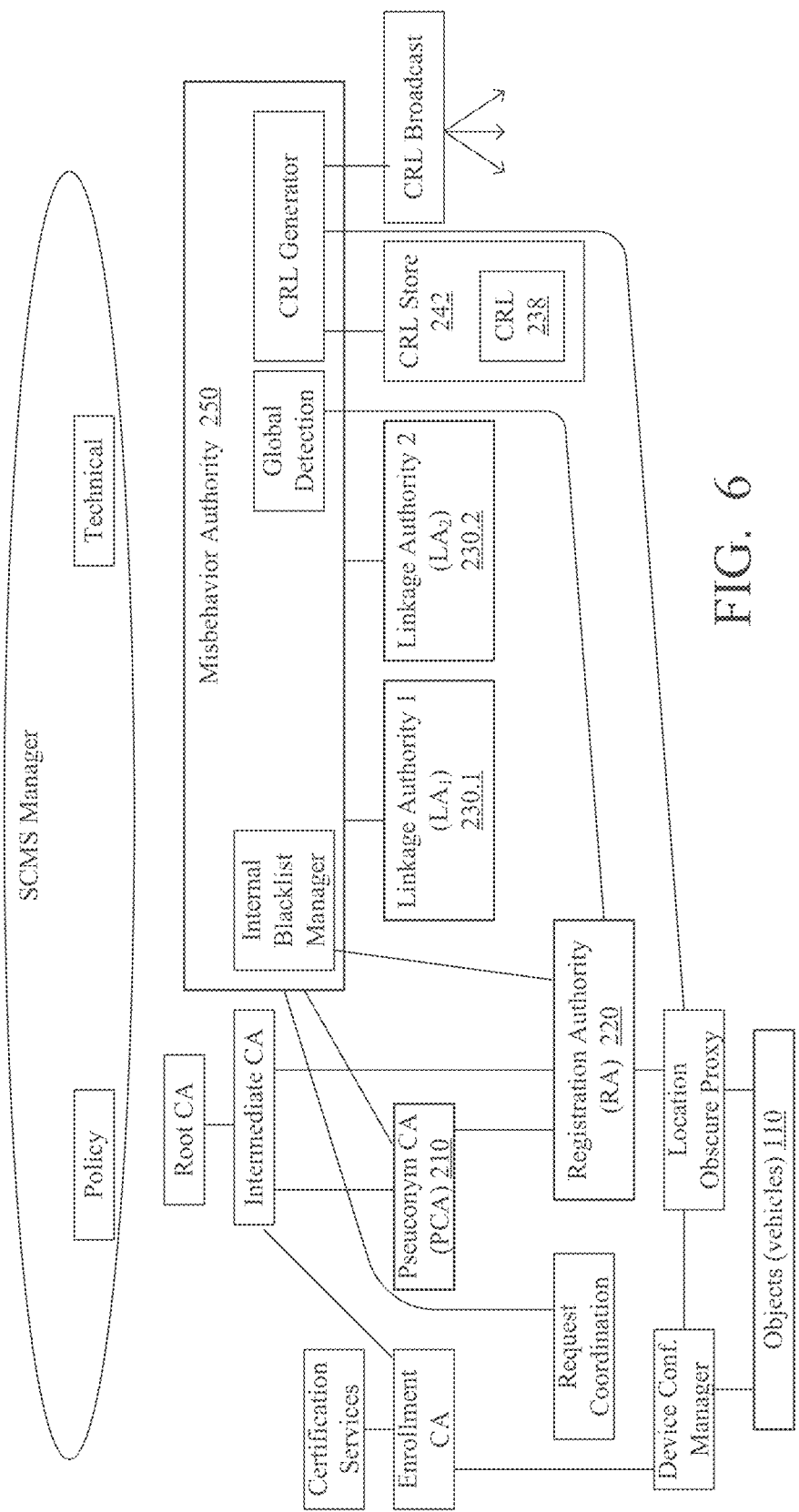
FIG. 6 is a block diagram illustrating a computer system architecture for digital certificate management, according to some embodiments.

FIG. 6 illustrates an exemplary computer system architecture environment for SCMS. SCMS was designed to allow the distribution of multiple pseudonym certificates to vehicles in an efficient manner while providing mechanisms for easily revoking them in case of misbehavior by their owners.

In SCMS, a Registration Authority (RA) 220 provides batches of pseudonym certificates 160p to authorized vehicles or objects 110/150. A batch is generated from a single request received from a vehicle, in the butterfly key expansion process. RA 220 validates the vehicle requests by the vehicles' enrollment certificates 160. In addition to an enrollment certificate, each request includes some public keys (other than 164) generated by the vehicle for the pseudonym certificate provisioning process. RA 220 then shuffles together the keys belonging to different users before individually sending them to a Pseudonym Certificate Authority (PCA) 210. As such, the PCA 210 cannot link a group of requests to a same object 110/device 150. The PCA 210, in turn, creates valid certificates 160p, and encrypts and signs them before delivering them to the RA for forwarding to the devices 110/150. Since the certificates 160p are encrypted, the RA cannot link a pseudonym certificate 160p to a device 110/150. Unless the PCA and RA collude, they are unable to link a certificate 160p to its owner 110/150.

Linkage Authority (LA) 230, or rather linkage authorities LA₁ and LA₂—also labeled as 230.1 and 230.2—generate random-like bitstrings that are combined to create a linkage value (lv 234 in FIGS. 5A, 5B) added to pseudonym certificates 160p so that the pseudonym certificates can be efficiently revoked. The lv values are different for different pseudonym certificates, but they can be linked together for a given enrollment certificate 160.

Misbehavior Authority (MA) 250 obtains a misbehaving device's certificate 160p and uses the certificate's lv 234 and data obtained from the RA and PCA to revoke all of the same device's certificates 160p.

In some embodiments, each of RA 220, PCA 210, LAs 230, and MA 250 can be implemented with or incorporate one or more computing devices (e.g., computing device 150 or computer systems 316).

Safety Messages and Authentication

Among the main goals of an Intelligent Transportation System (ITS) are reducing traffic congestion and increasing safety for both vehicles and pedestrians. To this end, the ITS employs or relies on Vehicular-to-Everything (V2X) communications for distributing information about road conditions (e.g., accident or speed limit notifications) and about nearby vehicles (e.g., position, speed, and direction), which in some examples, can be in the form of various safety messages. Given their critical nature, safety messages must be authenticated to prevent the dissemination of false information by malicious entities.

Since vehicles or other entities and objects 110 should quickly react to any emergency situation, safety messages exchanged among them must follow quite strict timing requirements. For example, to enable the quick distribution of such messages, they are designed to have a small size. Specifically, in some examples, the messages are expected to include a payload of 50-300 bytes, plus security-related information like a 117-byte pseudonym certificate and a 64-byte digital signature. Since all messages must be signed, but four out of five might include only a 8-byte certificate identifier rather than the actual certificate, in some examples, their total size should range from 122-481 bytes. In addition, the maximum latency for processing critical messages (e.g., those related to crashing avoidance) can be as low as 20 ms.

Besides transmission latency, it is also desirable to minimize the time taken for processing safety messages upon their arrival. Part of this processing time is due to the application(s) responsible for handling those messages, such as trajectory prediction and collision avoidance hardware and/or software running on the computing devices 150 used or incorporated in the vehicles, entities, or objects 110. Another component, e.g., other hardware or software, may refer to the messages' signature verification process, in particular because the number of individual messages received by each vehicle may reach the order of thousands, in some examples.

Taking such timing requirements into account, the standardization process for V2X message broadcasting in the United States considered three approaches for message authentication: using simply ECDSA-based digital signatures (as described in more detail in NIST, FIPS 186-4: Digital Signature Standard (DSS), National Institute of Standards and Technology, July 2013, the entirety of which is incorporated herein by reference), the TESLA authentication scheme (as described in more detail in A. Perrig, et al., "Efficient authentication and signing of multicast streams over lossy channels," in Proceeding 2000 IEEE Symposium on Security and Privacy, S P 2000, May 2000, pp. 56-73, the entirety of which is incorporated herein by reference), or a combination of both, called TESLA and Digital Signatures (TADS). In the end, the decision was to use only ECDSA signatures, an approach that is also adopted in European standards.

To deal with the large number of messages received by vehicles, though, the adoption of a Verify-on-Demand (VoD) mechanism has been proposed. In summary, this means that received messages are first processed by the application layer, and then their signatures are verified only when some warning or control action is required (e.g., if they indicate the possibility of a collision). As a result, the security overhead becomes proportional to the number of relevant messages received by the vehicle, i.e., only messages that raise system's threat level beyond a defined threshold are actually verified. In regular operations, this VoD strategy is expected to be considerably more efficient than a "verify-then-process" approach, in which all received messages would have their signatures verified before being handed over to the application layer. However, in some examples, this higher efficiency due to on-demand verification may be problematic when the application layer requires several messages to be verified at once. This would be the case, for example, if a trajectory prediction algorithm relies on a sliding-window of past messages, which would be verified altogether only when a potential emergency situation is detected. The system would then be forced to decide between two strategies: (1) verify all messages, even if this delays potentially critical actions; or (2) verify as many messages as possible in an acceptable time interval, and then risk taking actions based on false data. Designing mechanisms to minimize the overhead of individual and multiple signature verifications in V2X communications is paramount to optimize either strategy and, thus, avoid the need for more expensive onboard hardware (one of the goals of VoD itself).

According to some embodiments, to address this issue, systems and methods are provided to implement an efficient mechanism for enabling on-demand verification of a sequence of messages sent by the same source, under the same pseudonym. In some examples, the systems and methods may use a hash chaining mechanism, where each signed message carries the hash value (or simply "hash") of its predecessor, to link together multiple messages. As a result, verifying the signature of the message at the end of the chain is enough to ascertain the authenticity of prior messages, leading to considerable performance gains when compared to their individual verification.

In some examples, the systems and methods may allow signature verifications to be traded by operations that are significantly less resource intensive, like hash functions and Message Authentication Codes (MACs). In some examples, the techniques or approach using MACS relies on the delayed disclosure of keys. In some examples, the techniques or approach using hash values is based on hash chaining where, in some implementations, each signed message is linked to one or more of its predecessors by carrying their respective hashes. In both cases, verifying the signature of one message is enough to ascertain or validate the authenticity of prior messages. Thus, with a relatively small increase in the messages' size, one can obtain considerable performance gains when compared to individual signature verifications.

V2X Communications

To support V2X communications, vehicles, entities, or other objects 150 must be equipped with transceivers for reliable and low latency radio access technology. Examples of possible technologies are Dedicated ShortRange Communication (DSRC) and Cellular-V2X (C-V2X), New Radio V2X, and 802.11bd. In some examples, the minimum transmission radius is expected to be around 300 m, with a packet error rate below 10% within this range.

Using such communication capabilities, vehicles 150 can exchange relevant information with their surroundings, including other vehicles, roadside equipment, and pedestrians. The purpose of those messages exchanged between the various entities and objects 150 is to inform about their respective locations and status at each time, so adequate actions can be taken, e.g., automatically or semi-automatically, to improve transportation safety and efficiency. For example, if vehicles regularly broadcast their position and brake status, collisions can be avoided if vehicles autonomously adjusts their speed, or issue warnings to drivers not respecting a safe following distance. As another example, smart traffic lights can adjust their cycling times aiming to optimize the flow of vehicles and pedestrians. In some examples, the expected frequency in which messages are sent by each vehicle is around 10 Hz (i.e., 10 messages per second), although other examples may allow a lower rate, e.g., to avoid overburdening the communication channel. On a busy road, this may still translate to more than 1,000 messages received per second by each vehicle 150.

There are two main data formats for conveying safety information among vehicles: Basic Safety Messages (BSM), which follow the format defined in the SAE J2735 standard (described in more detail in SAE, "J2735: Dedicated short range communications (DSRC) message set dictionary," SAE International, Tech. Rep., March 2016, which is incorporated herein by reference) and are adopted in IEEE 1609.2; and Cooperative Awareness Messages (CAM) (described in more detail in ETSI, "EN 302 637-2 (v1.4.1) intelligent transport systems (ITS), vehicular communications, basic set of applications—part 2: Specification of cooperative awareness basic service," European Telecom Standards Institute, Tech. Rep., April 2019, which incorporated herein by reference), employed in C-ITS.

The main fields in a BSM message, which are mandatory in every transmission, are as follows (note that, for privacy-preserving purposes, none of them is easily linkable to a specific vehicle, driver or owner):

Message Count: a repeating sequence incremented for every message, ranging from 0 to 127, useful to identify transmission errors.

Temporary ID: a randomly generated 4-byte number.

Time: timestamp using the Coordinated Universal Time (UTC), with a 1 ms accuracy.

Location: latitude and longitude from the center of the vehicle, with a 1.5 meter accuracy.

Elevation: vehicle's elevation, with a 3 meter accuracy.

Speed: reported in increments of 0.02 mph (0.032 km/h), with a 1 km/h accuracy.

Heading: motion of the vehicle center, with a 2 degrees accuracy when the vehicle speed is greater than 12.5 m/s and a 3 degree accuracy otherwise.

Acceleration: location and elevation accelerations, with a 0.3 m/s$^2$ accuracy for the location and a 1 m/s$^2$ accuracy for the elevation.

Yaw rate: reported with a 0.5 degrees/s accuracy. Combined with the steering wheel angle, this measure can predict if the vehicle is spinning Transmission state: reports the basic transmission state (neutral, reverse, or forward).

Steering wheel angle: the steering wheel angle, with a 5 degrees accuracy.

Vehicle size: the vehicle's length and width, with a 0.2 meter accuracy.

The standard also foresees some additional, optional fields that could be sent periodically, possibly at a reduced rate compared to the overall BSM transmission rate. Examples include brake system status, path history, path prediction, exterior lights and multiple event flags (e.g., airbag deployment or flat tire).

The structure of Cooperative Awareness Messages (CAMs) comprises the same or similar fields, including generation time, position, speed, heading, and acceleration. One main exception among the mandatory fields is the absence of the "Message Count" element. Given this similarity between CAMs and BSMs, the following simply refers to or uses "BSM" to indicate both types of safety messages, unless explicitly stated otherwise to take into account the differences between them.

Batch Verification of V2X Messages

In the V2X scenario, all safety messages must be digitally signed by the sender, so receiving vehicles or objects 150 can check their authenticity before acting upon them. As a result, messages are discarded if they have invalid signatures or are not associated with a certificate issued by an authorized Certificate Authority (CA). Given the large number of messages received per second, however, vehicles may be required to prioritize the verifications of messages considered more critical, using a Verify-on-Demand (VoD) approach. In particular, the safety applications running on the vehicle could provide a "threat level" associated with each set of messages received, based solely on their payload. Whenever the threat level surpasses a certain threshold, the authenticity of the n messages that raised the issue must be verified. Such a batch verification procedure is required, for example, in Forward Collision Warning (FCW) applications, where multiple messages are used for computing the trajectory of a vehicle ahead, in the same lane and direction. Ideally, this verification should be finished before any automatic action is taken by the vehicle 150 or a warning is issued to its occupants, aiming to avoid hazardous responses or raising false alarms to users.

Figures 7, 8:
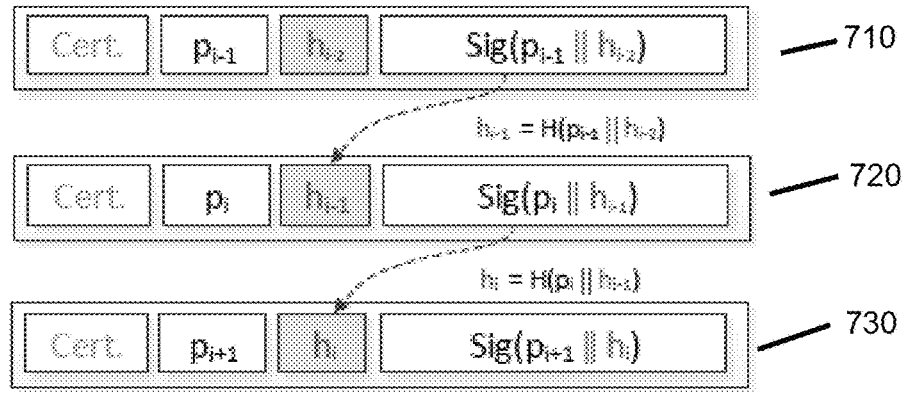
FIG. 7 illustrates an example of message verification via hash chaining, according to some embodiments.
FIG. 8 illustrates a method for message verification with no chaining, according to some embodiments.

In principle, verifying the authenticity of n safety messages would require checking their n individual signatures. This is illustrated in FIG. 8, which shows a method 800 for message verification. Method 800 takes as input a sequence of safety messages that may include: authentic messages, i.e., whose signatures are valid; forged messages, with invalid signatures; and gaps (identified as null), due to transmission errors. Here, the vehicle or object 150 running method 800 simply checks the signature of each message, checkSig($m_i$). Thus, with method 800, the cost per non-null message is one signature verification. In practice, gaps in the V2X message sequence can be easily inferred by the application layer using the messages' timestamps. Actually, since BSMs (unlike CAMs) have a mandatory "Message Count" field, gaps can be even more easily identified when counting values are skipped. The algorithm then filters out invalid messages, leaving them as gaps in the output array.

The systems and methods of the present disclosure attempt to reduce or avoid the burden of verifying n individual signatures on demand as in method 800. According to some embodiments, the systems and method disclosed herein provide or implement mechanisms that considerably accelerate verification whenever (some of) those n messages come from the same source.

Authentication of Safety Messages Via Message or Hash Chaining

In principle, verifying the authenticity of n safety messages would require checking their n individual signatures. To avoid such overhead, however, according to some embodiments, systems and methods of the present disclosure can accelerate the batch verification process whenever (some of) those n messages were sent by the same source. In some embodiments, this is accomplished by including the hash of the previous BSM (or a few previous BSMs) in each broadcast, so the signature of one BSM is actually able to validate a series of previously stored BSMs. This technique is illustrated in FIG. 7, and discussed in more detail below.

Message Description and Verification

FIG. 7 illustrates an example of message verification via hash chaining, according to some embodiments. For this, each message from a particular source or entity can include a field for the hash value of a preceding message from the same source. FIG. 7 shows three messages 710, 720, and 730, corresponding to respectively $m_{i-1}$, $m_i$, and $m_{i+1}$, all sent from the same sender (e.g., vehicle or object 150). Each message $m_i$ includes, e.g., a respective payload ($p_i$), a hash value of the preceding message ($h_{i-1}$), and a message signature $sig_i$.

Suppose that the i-th safety message sent by a vehicle 150 corresponds to the triple $m_i = (p_i, h_{i-1}, sig_i)$, where p is the message's payload, as described above; $h_{i-1}$ is the hash of the preceding message, $m_{i-1}$; and $sig_i = Sign(p_i \| h_{i-1},)$ is the signature of $m_i$, computed using the sender's private key for which the public counterpart U is enclosed in a valid pseudonym certificate. In this scenario, if $m_i$'s signature is authentic, the previously transmitted $m_{i-1} = (p_{i-1}, h_{i-2}, sig_{i-1})$ can be validated simply by checking whether $h_{i-1} = H(p_{i-1} \| h_{i-2})$. After all, attackers should be unable to forge a message with same hash as for any collision-resistant hash function. Analogously, $m_{i-2}$ can be considered valid as long as its hash matches the value of $h_{i-2}$ enclosed in an authentic $m_{i-1}$, and so forth. Hence, when checking a sequence of n messages from a single sender, there is no need to verify each individual signature $sig_{i-1} \ldots sig_{i-n}$, since the data authenticated by such signatures are also indirectly authenticated by $sig_i$. This allows the receiver (e.g., another vehicle or object 150) to trade signature verifications for hash computations, amortizing the costs of the former over multiple messages. Namely, the only situation in which the hash chaining approach of the present disclosure would not provide any gain is when every other message is lost during transmission. In this peculiar case, all [n/2] received messages need to have their signatures verified, since the hashes that would enable their faster verification would be unavailable.

FIG. 9 illustrates a method 900 for message verification with hash chaining, according to some embodiments. In some examples, method 900 may be performed or implemented, in whole or in part, by one or more devices, objects, users, equipment, or entities 110 or 150 operating in the example V2X environment, ITS architecture, or SCMS as described above with reference to FIGS. 1-6. These may include, but are not limited to, vehicles, on-board equipment or unit (OBE or OBU), roadside equipment or unit (RSE or RSU), and computer systems or networks, incorporated therein or located separately (e.g., in the cloud), for generating, collecting, storing, and processing data.

Method 900 receives as input a sequence of safety messages $m_{[1 \ldots n]}$. These safety messages may include: authentic messages, i.e., whose signatures are valid; forged messages, with invalid signatures; and gaps (identified as null), due to transmission errors. In some examples, method 900 may also receive as input a signer's public key U or other relevant data; this data may act as a salt in the hash function computation, making the solution more resilient to attacks based on hash collisions.

Method 900 assumes that the order of the messages can be inferred from their timestamps (or, for BSMs "message count" values). Nevertheless, it can be adapted to handle inputs where multiple messages appear to occupy the same time slot, i.e., that have very close timestamps or the same "message count." Specifically, since this situation should not occur unless fake messages are inserted in the network, it would suffice to look for the first message whose signature or hash value is valid among the duplicates. If none is found to be valid, then the authentic message was probably lost during transmission, and the algorithm would keep null in the output array's corresponding position to indicate that loss.

The method 900 filters out invalid messages, leaving them as gaps in the output array $V_{[1 \ldots n]}$. In practice, gaps in the V2X message sequence can be readily inferred by the application layer using the messages' timestamps. Actually, in the specific case of BSMs, the mandatory "Message Count" field facilitates this task, as a skipped counting value indicates a gap.

At a process 910, the vehicle or other object 150 running method 900 receives the set or sequence of safety messages to verify $m_{[1 \ldots n]}$. At a process 920, vehicle or object 150 checks or determines whether the message signature Sig(m) is valid for the signer's public key U, thereby verifying the message $V_i$.

At a process 930, if there was a previous message $m_{i-1}$ from the same sender, vehicle or object 150 performs a hash computation, H ($m_{i-1}$). In some examples, the signer's public key U is included in the hash computation, which might then become H ($m_{i-1}$, U). If the result of this hash computation matches or equals the hash $h_{i-1}$ carried by the current message $m_i$, then the prior message is also verified $V_{i-1}$, albeit indirectly. If the result of the hash operation performed on the prior message does not match the hash carried by the current message, the prior message is considered invalid, and not included in the output sequence of verified messages $V_{[1 \ldots n]}$.

Thus, in some examples, with method 900, at the cost of one hash computation, H ($m_{i-1}$)=$h_{i-1}$, some valid messages can be indirectly verified and invalid messages are filtered out.

In some examples, method 900 can be adapted to handle inputs that include multiple messages with same "message count" value (or very close timestamps). Specifically, since this situation should not occur unless fake messages are inserted in the network, it would suffice to look for the first message whose signature or hash value is valid among the duplicates. If none is found to be valid, then the authentic message was probably lost during transmission, and the algorithm would keep null in the output array's corresponding position.

Extended Chaining

According to some embodiments, the basic approach of chaining described above with respect to method 900 can be extended in such a manner that each $m_i$ carries multiple hashes instead of one. This is shown in FIG. 10, which illustrates a method 1000 for message verification with extended chaining, according to some embodiments. In some examples, method 1000 may be performed or implemented, in whole or in part, by one or more devices, objects, users, equipment, or entities 110 or 150 operating in the example V2X environment, ITS architecture, or SCMS as described above with reference to FIGS. 1-6. These may include, but are not limited to, vehicles, on-board equipment or unit (OBE or OBU), roadside equipment or unit (RSE or RSU), and computer systems or networks, incorporated therein or located separately (e.g., in the cloud), for generating, collecting, storing, and processing data.

Method 1000 assumes or receives as input a sequence of safety messages $m_{[1 \ldots n]}$, which may include: authentic messages, i.e., whose signatures are valid; forged messages, with invalid signatures; and gaps (identified as null), due to transmission errors. As described above with respect to FIG. 7, each message includes, e.g., a respective payload ($p_i$), a hash of the preceding message ($h_{i-1}$) from the same sender, and a message signature $sig_i$. In some embodiments, with method 1000, it is assumed that each message carries e hashes (e.g., $h_{i-1}$, $h_{i-2}$, $h_{i-3}$). In some examples, each of the hash computations may include the signer's public key U or other relevant data.

Method 1000 implements or performs hash chaining that allows a large sequence of messages from the same source to be validated by verifying a single digital signature. At the cost of one hash computation, some valid messages can be verified and invalid messages are filtered out. Thus, method 1000 provides, supports, or implements batch verification processing of sequences of messages from the same sender.

At a process 1010, the vehicle or other object 150 running method 1000 receives the set or sequence of safety messages $m_{[1 \ldots n]}$ to be verified. These messages may be stored in the memory of a computing device of the vehicle 150. The vehicle 150 generates a map M of these messages by index Map( ), so it can readily identify which messages in the sequence are indirectly validated by a given signature. In some examples, a public counterpart of the private key is enclosed in a valid pseudonym certificate. In some examples, the object 150 uses the respective position of the messages in the sequence as indexing keys to map the messages.

With method 1000, not all messages received by the vehicle or object 150 are verified immediately or upon receipt, thereby reducing processing overhead at the vehicle. Instead, some messages are placed into a map, which in some examples, can be organized according to sending device—i.e., the messages to be verified are grouped or arranged in the map according to the particular devices (as identified with a respective public key) which sent the messages. In some examples, the messages associated with or corresponding to a particular sending device are organized or arranged according to the time when they were received. Only when needed (e.g., in an actual safety situation) or upon some other triggering event (e.g., a specified time interval or after the vehicle has accumulated a specified number messages), the vehicle or object 150 will perform a batch verification of various sequences of messages in the map.

At a process 1020, for the latest message $m_l$ to verify, object 150 removes or obtains the latest message m in the sequence of messages to be verified, which can enable the validation of previous messages, and checks the signature Sig(m) of that message m.

At a process 1030, vehicle or object 150 checks or determines whether the message signature Sig(m) is valid, thereby verifying the latest message $m_l$. If the signature is valid, then at process 1040, the object 150, using information from the indexed map M, generates or creates a queue Q of messages previously sent from the same sender as the verified message Queue($m_l$). These other messages have yet to be verified by the object 150. In some examples, the messages in the queue are organized or arranged according to the time at which each message was received by the vehicle, with the latest received messages appearing first in the queue and the earliest received messages appearing at the end—i.e., in reverse chronological order.

While the queue Q is not empty (meaning that there are prior, unverified messages from the same sender that can be indirectly authenticated by the already verified signature of some later message m), object 150 performs or attempts indirect verifications of all of the messages in the queue. In some examples, for this, method 1000 operates or uses the hashes that are contained in the queued messages.

For each message $m_i$ in the queue, at process 1050, object 150 first removes the message from the queue Q:Dequeue( ), and then attempts to verify the message indirectly, by computing its hash and verifying if it matches a hash carried by some already verified messages. If the message is verified, it is added to the output of verified messages $V_i$.

At process 1060, vehicle or object 150 checks each of the message's one or more hashes h (see e.g., FIG. 7). If a particular message $m_{i-j}$ is in the indexed map M, then it has not yet been validated. For each such unvalidated message, it may be verified by checking against the hash carried in a subsequent message that has already been verified or validated, starting with the latest message $m_i$.

At process 1070, vehicle or object 150 performs a hash computation, H $(m_{i-j})$. If the result of this hash computation matches or equals the hash $h_{i-j}$ carried by the valid message $m_i$, then the prior message is also verified, indirectly, and can be added or included in the set of verified messages V. At process 1080, the vehicle or object 150 removes the message $m_{i-j}$ from the map M, as the message has been validated. Alternatively, if the result of the hash operation performed on the prior message does not match the hash carried by the valid message $m_i$, the prior message is considered invalid, and not included in the output sequence of verified messages $V_{[1 \ldots n]}$.

Method 1000 thus filters out invalid messages, generating as output an array or sequence $V_{[1 \ldots n]}$ containing only verified messages. At a process 1090, the method 100 returns or outputs the sequence of verified messages V.

The motivation for such extended chaining as performed in method 1000 can be understood with a simple example. Suppose that each message $m_i$ includes only the hash for $m_{i-1}$, as shown in FIG. 7. If a vehicle 150 receives $m_{i-2}$ and $m_i$, but misses the transmission of $m_{i-1}$, then the link between $m_{i-2}$ and $sig_i$ is lost. Therefore, the authenticity of the received messages can only be ascertained by verifying $sig_{i-2}$ and $sig_i$ directly. To avoid this performance penalty, $m_i$ could carry the hashes for both $m_{i-2}$ and $m_{i-1}$, so any non-contiguous message loss would not incur additional signature verifications. Thus, in some examples, for less reliable channels, additional hashes can be inserted in each message to provide similar processing savings. Actually, more generally, (possibly non-contiguous) messages could be included in each broadcast.

Thus, disclosed herein are systems and methods implementing a mechanism based on hash chaining that allows a large sequence of messages from the same source to be validated by verifying a single digital signature. Theoretical and experimental analyses show that, by including a single hash value each safety message, the expected savings can be on the order of 90% for very reliable communication channels, and remain higher than 65% when the maximum packet loss rate is 20%. It is also shown that, for less reliable channels, additional hashes can be inserted in each message to provide similar processing savings. These systems and methods can be further combined with other mechanisms intended for alleviating the load of V2X message validation, such as prioritization and batch signature verification, to efficiently handle messages from different sources.

In the specific context of V2X, consideration may be given to such extended chaining approach of the present disclosure.

First, critical applications are the most prone to benefit from faster verification of a sequence of messages, so they can help drivers to react quickly. However, they are also the less likely to require the verification of many old messages, in particular messages older than the driver's natural reaction time. Since the average reaction time for an attentive driver is around 1 second, the ability to quickly verify sequences containing much more than 10 or 20 messages may not be of much use for critical applications.

Furthermore, the bandwidth overhead of each additional hash is not negligible when compared to the size of V2X messages. More precisely, a typical 16-byte hash corresponds to an overhead of 3% to 13% over the expected size of 122-481 bytes for the safety messages previously mentioned. Since reducing the safety messages' size is a core requirement in V2X environments, adding much more than one or two hashes per message may be too much of a bandwidth burden in some examples.

Finally, one of the main benefits of such extended chaining, as provided in method 1000, is that it makes the overall system more resilient to lossy communication channels. In particular, including the hashes for non-contiguous packets in each broadcast message is an interesting approach for avoiding burst packet losses. For example, if two hashes are placed in $m_i$, then choosing $(h_{i-1}, h_{i-3})$ instead of $(h_{i-1}, h_{i-2})$ allows $m_{i-3}$ to be indirectly verified even if both $m_{i-1}$ and $m_{i-2}$ are lost. Nevertheless, such resilience may come at the cost of delayed verification. To understand this issue, consider the previous example: if $m_{i-1}$ is lost, having $m_i$ carry only $h_{i-1}$ and $h_{i-3}$ would delay the verification of $m_{i-2}$ until the arrival of $m_{i+1}$ (which would carry $h_i$ and $h_{i-2}$). Since this delay translates to about 100 ms, there should be sufficient time to verify the signature of $m_{i-2}$ directly. In addition, studies with the DSRC technology and real world V2X data, indicate that burst data losses are actually not the most common in V2X environments. Indeed, such studies show that Inter-Packet Gaps (IPG) of up to 400 ms (i.e., up to 3 contiguous packets lost) are to be expected, while longer IPGs are usually correlated (e.g., indicate that the sender moved too far from the receiver).

Authentication of Safety Messages with Message Authentication Codes (MACs

The Timed Efficient Stream Loss-tolerant Authentication (TESLA) scheme relies on a Message Authentication Code (MAC) whose secret keys, generated via cryptographic pseudorandom functions, are disclosed in a timeliness manner More formally, TESLA considers three sequential time instants, $t_0$, $t_1$, and $t_2$. At instant to, the message sender S commits to a key k by publishing its hash H(k) via an authenticated channel. This commitment is then used as a secure anchor for the authentication scheme. At $t_1$, message m and its authentication tag $MAC_k$ (m) computed with secret key k is sent by S. Such a message cannot be authenticated by receiver R until instant $t_2$, when S publishes k. Then, at $t_2$, R learns the disclosed k and performs two verifications for authenticating m. First, R computes H(k) and checks if it matches the secure anchor of to. Second, if the first check is successful, R verifies if $MAC_k$ (m) matches the authentication tag received with message m.

TESLA can be expanded to authenticate multiple messages, sent at different time windows. This is accomplished by using a hash chain to generate multiple keys from the same random seed key $k_s$. First, the following hash chain is computed:

$$k_n = H(k_s); k_{n-1} = H(k_n); k_{n-2} = H(k_{n-1}); \ldots;$$
$$k_1 = H(k_2) =; k_0 = H(k_1);$$

Then, at instant $t_0$, the sender publishes $k_0$ using an authenticated channel as the secure anchor for the subsequent messages. Thereafter, at instant $t_i$, for $1 \le i \le n$ and $t_i \leq t_{i+1}$, message $m_i$ is sent with authentication tag $MAC_{ki}$ ($m_i$). Finally, at instant $t_{n+1}$, $k_s$ is published. The receiver can then compute the entire hash chain from $k_s$, and check if the last element calculated, $k'_0$, matches the broadcast value $k_0$. If that is the case, all the computed $k_j$ ($0 \leq j \leq n$) are considered authenticated, and the receiver proceeds by calculating all $MAC_{kj}$ ($m_j$) and validating the corresponding messages Aiming to shorten the authentication delay, the sender may also include key $k_{i-a}$ (where $a \geq 1$) with message $m_i$, so the receiver does not have to wait until instant $t_{n+1}$ to start verifying messages.

The TESLA and Digital Signature (TADS) scheme was proposed to address two deficiencies of the standalone TESLA framework: its critical dependency on the distribution of secure anchors, and delayed message verification. TADS adds a digital signature in complement to the TESLA scheme. Specifically, all messages in TADS carry, in addition to their authentication tag, a digital signature. Hence, receivers can fall back to signature verification when validating messages: (1) if the secure anchor transmission is lost, or (2) if verification is required before the corresponding key (or its seed) is published.

According to some embodiments, systems and methods of the present disclosure adapt or employ the TADS framework for a VoD setting. FIG. 12 illustrates an example of message verification with VoD-adapted TADS, which itself relies on MAC, according to some embodiments. For this, each message from a particular source or entity can include a field for the key of a preceding message from the same source. FIG. 12 shows three messages 1210, 1220, and 1230, corresponding to respectively $m_{i-1}$, $m_i$, and $m_{i+1}$, all sent from the same sender (e.g., vehicle or object 150). Each message $m_i$ includes, e.g., a respective payload ($p_i$), a key the preceding message ($k_{i-1}$), an authentication tag ($MAC_k$), and a message signature $sig_i$.

By using the variant of TESLA where every message $m_i$ carries the key $k_{i-1}$ employed in the authentication of the immediately preceding message $m_{i-1}$, any message acts as a secure anchor for the key hash chain. Because each message $m_i$ is also signed, verifying this signature indirectly validates key $k_{i-1}$, as well as all previous keys $k_{i-j}$ (with $j>1$) that can be derived from it. Note that, with this adaptation, there is no need for the sender to commit to a specific security anchor $k_0$. After all, the signature verification over $k_{i-1}$ already ensures the legitimacy of any pre-image of $k_{i-1}$, including the actual anchor $k_0$. The resulting scheme can then efficiently handle transmission errors: even if there is a gap in the sequence of messages to be verified, the receiver can still use $k_{i-1}$, validated via signature verification, to compute the MAC keys for messages placed before and after the gap.

FIG. 13 illustrates a method 1300 for message verification using MACs, according to some embodiments. In some examples, method 1300 may be performed or implemented, in whole or in part, by one or more devices, objects, users, equipment, or entities 110 or 150 operating in the example V2X environment, ITS architecture, or SCMS as described above with reference to FIGS. 1-6. These may include, but are not limited to, vehicles, on-board equipment or unit (OBE or OBU), roadside equipment or unit (RSE or RSU), and computer systems or networks, incorporated therein or located separately (e.g., in the cloud), for generating, collecting, storing, and processing data.

Method 1300 assumes or receives as input a sequence of safety messages $m_{[1 \ldots n]}$, which may include: authentic messages, i.e., whose signatures are valid; forged messages, with invalid signatures; and gaps (identified as null), due to transmission errors. As described with respect to FIG. 12, each message $m_i$ includes, e.g., a respective payload ($p_i$), a key employed in the authentication of the immediately preceding message ($k_{i-1}$), an authentication tag ($MAC_k$), and a message signature ($sig_i$). In some examples, method 1300 also receives as input the signer's public key U. With method 1300, a single valid signature enables the verification of multiple messages m using their corresponding MACs.

At a process 1310, the vehicle or other object 150 running method 1300 receives the set or sequence of safety messages to verify $m_{[1 \ldots n]}$. At a process 1320, vehicle or object 150 checks or determines whether the message signature Sig(m) is valid, thereby verifying the message $V_i$. In some examples, method 1300 uses or considers the signer's public key U in the signature check.

At a process 1330, if there was a previous message $m_{i-1}$ from the same sender, vehicle or object 150 computes an authentication tag or MAC key for this message, H(k). If the result of this hash computation matches or equals the key $k_{i-1}$ carried by the current message $m_i$, then the prior message is also verified $V_{i-1}$, albeit indirectly. If the result of the MAC key operation performed on the prior message does not match the hash carried by the current message, the prior message is considered invalid, and not included in the output sequence of verified messages $V_{[1 \ldots n]}$.

In some examples, an additional adjustment required in this adapted TADS refers to how the hash chains linking the different MAC keys are computed: instead of computing $k_{i-1}=H(k_i)$, vehicles should make $k_{i-1}=H(k_i, U)$, where U is the public key enclosed in the pseudonym certificate employed by the signer when sending message $m_i$. The reason for this modification in the original TADS is to avoid birthday attacks. More precisely, let the keys employed in the system be l-bits long, so the hash function employed is truncated to match that length; for example, a value of l=96 is suggested. Also, suppose that an attacker A picks random l-bit values x and computes their corresponding hash chains $H^c(x)$, for some arbitrarily small c. Assume that A builds a table containing $2^{l_1}$ pairs $\{H^c(x), x\}$ for some arbitrary $l_1 < l$, and is later able to observe $2^{l_2}$ secret keys $k_i$ disclosed by legitimate vehicles. According to the birthday paradox, as $l_1+l_2$ approaches l, there is a high probability that at least one of those $k_i$ will match one of the table indices $H^c(x)$. Whenever that occurs, A can repeatedly hash the corresponding x to obtain some $k_{j>i}$ that are valid pre-images of $k_i$. Assuming that such $k_{j>i}$ match the ones employed by the legitimate sender, rather than being second pre-images, they can be used by A to compute valid MACs for forged messages in subsequent time frames $t_{j>i}$. This does not allow A to compute valid signatures for those forged messages, however. In particular, the message that triggers the verification procedure is likely to have its signature evaluated by the receiver, and, thus, it might be difficult to trigger such alerts using this attack technique. Nevertheless, after a legitimately signed message triggers an alert, attackers would be able to trick the receiver into accepting some invalid messages, which in itself may be harmful to the system.

Fortunately, adding the public key U to the computation of hash chains as hereby described frustrates such birthday attacks. The reason is that, analogous to a random salt in the context of password-hashing or to security strings in SCMS's certificate linkage procedure, each attack table would only be useful for a specific U.

Compatibility with Existing Standards

In some embodiments, the approaches of the present disclosure benefits from the IEEE 1609.2 packet format, which assumes that the payload to be signed may include both: (1) data explicitly transported within the packet; and (2) the hash value of data not explicitly transported within the packet, but that the sender wants to cryptographically bind to the signature. Hence, in the case of the hash chaining approach, this latter "external data" field could correspond to the hash of the previously sent message (or omitted for the very first message sent under a given pseudonym). For TADS, the same field could carry the message's authentication tag and the key employed in the preceding message; in this case, and even though a MAC is essentially a keyed hash function, this can be seen as a loose interpretation of this field. In some examples, with either approach, the only modification required on current V2X standards would be on the security profile defined by the J2945/1 format for IEEE 1609.2 messages: this profile should allow additional data to be signed for BSMs.

As an alternative, the fields added by both solutions (highlighted in grey in FIGS. 7 and 12) could simply become part of the payload's data format, so no other field is required. Actually, if the mechanism adopted for fast batch verification adds more than 256 bits to each BSM, this alternative would be inevitable, given that this is the maximum size of the aforementioned "external data" field in the J2945/1 message format.

Simulation and Analysis

To evaluate both the basic and extended chaining strategies, we simulated several hash chaining configurations aiming to determine their average verification cost. More precisely, the simulator, available at doi.org/10.24433/CO.9668891.v3, takes into account the following parameters:

Window size: we consider scenarios in which the sequence of messages to be verified fits different window sizes. This is useful to assess the flexibility of the proposed approach, as well as to identify adequate configurations for different applications.

Hash chaining configurations: every $m_i$ may carry one, two or three hashes. We denote by C [p, j, k] the configuration where $m_i$ carries ($h_{i-p}$, $h_{i-1}$, $h_{i-k}$), and can thus be indirectly verified using either $m_{i+p}$, $m_{i+j}$ or $m_{i+k}$). For a window size of w, we evaluate all possible hash configurations, going from C [1] (i.e., the basic scheme described in Sec. 3.1) to C [w−1, w−2, w−3].

Missing packets: the number and pattern of missing packets inside a message window influences the number of signatures that must be directly verified. Therefore, our simulations considers all possible patterns for each window size, going from a scenario where only $m_{i-1}$ is missing to a scenario where $m_{i-1}$ through $m_{i-w+1}$ are lost. In some cases, we also single out patterns containing only burst data losses, aiming to evaluate which chaining configurations would better fit this scenario. Although such patterns are not expected to be too common in V2X environments, the corresponding tests enable the comparison with related works in Section 6.

Metric: for each hash configuration and window size, we compute the percentage of signature verifications (psv) for all patterns of missing packets in that window. For example, when psv=0.1, this means that 1 message out of 10 needs to have its signature verified, while the other 9 can have its authenticity checked indirectly, via hash computations. We then organize those patterns according to the total number of packets missed, i.e., going from the most reliable to a highly lossy communication environments.

First, we simulated every possible combination of hash configurations for window sizes of 8 to 20 messages (i.e., 0.8 to 2 seconds), aiming to determine the best configuration in each case. The result is that, on average, the contiguous configurations (namely, C [1], C [2,1] and C [3,2,1]) display the best psv in all settings. This is show in FIG. 11, which is a plot of the simulation results for w=10 (left) and w=20 (right). For comparison, FIG. 11 also shows configurations where each message carries hashes for similarly-spaced messages—i.e., for a window size of w the configurations having C [1+w/2, 1] for two hashes, and C [1+2w/3, 1+w/3, 1] for three hashes. The potential interest of such configurations is that, according to [14] and also to our simulations, they would lead to the best psv against burst data losses. Nevertheless, as depicted in FIG. 11, they should perform worse than their continuous counterparts in a V2X scenario, where packet loss is not expected to follow an exclusively burst pattern.

We also evaluated the savings provided by each additional hash when vehicles need to authenticate a sequence of safety messages. The goal in this case was to assess the difference between the main curves in FIG. 2 and, thus, understand how the extra bandwidth overhead brought by each hash translates to lower processing. As shown in detail in Table 1, the extra psv reduction for each hash after the first is small when less than 20% of the packets are lost. In such situations, a single hash is enough to ensure savings between 68% and 95% when compared to a scenario where all signatures are directly verified. A second hash may then be useful for less reliable communication scenarios. Indeed, when the packet losses reach up to 50%, this additional hash helps to keep the processing savings above 58%. A third hash, on the other hand, does not add much in terms of savings for the simulated messages windows. More precisely, this extra hash is particularly useful when packet losses are higher than 50%, when the extra processing savings reach up to 14%.

As a complement to the tests using a dedicated simulator described above, we also analyzed the basic and extended chaining methods in a traffic scenario under the Simulation of Urban Mobility (SUMO) tool. The goal of such simulation is to evaluate a more realistic V2X communication scenario, rather than assuming that all patterns for missing packets are equiprobable.

The results of the simulations are summarized in the table below.

| Verification Strategy | Window Size $w_{max} = 10$ | Window Size $w_{max} = 20$ |
| --- | --- | --- |
| Standard | 115787 (psv = 1) | 217064 (psv = 1) |
| Chaining C[1] | 32681 (psv = 0.28) | 52804 (psv = 0.24) |
| Chaining C[2,1] | 17956 (psv = 0.16) | 22020 (psv = 0.10) |
| Chaining C[3,2,1] | 15310 (psv = 0.13) | 16185 (psv = 0.07) |

As observed in this table, a total of 115,787 and 217,064 messages have to be verified for w=10 and w=20, respectively. Hence, when no chaining mechanism is present (i.e., psv=1), this would be the total number of signature verifications. When each message carries the hashes of predecessors, though, this number drops dramatically. More precisely, for the C [1] configuration, the resulting savings are such that psv=0.28 and psv=0.24 for w=10 and w=20, respectively. We note that such numbers are very close to the theoretical results from FIG. 11 for a 20% packet loss. The C [2,1] and C [3,2,1] configurations, on the other hand, have a slightly worse performance for w=10. Nevertheless, for w=20, the results for C [2,1] and C [3,2,1] are also similar to our theoretical results. Specifically, for w=10, we obtained psv=0.16 for C [2,1] and psv=0.13 for C [3,2,1], when the expected values would be psv=0.15 and psv=0.09, respectively; for w=20, the result was psv=0.10 for C [2,1] and psv=0.07 for C [3,2,1], matching the expected psv=0.10 and psv=0.07 depicted in FIG. 11. Such results corroborate the analysis from above, showing that: (1) inserting at least one hash into the V2X safety messages can lead to relevant savings in the number of signature verifications; and (2) for a verification window as small as 1 or 2 seconds and low packet loss rates, including a single hash (or maybe two) on each message is likely to be enough.

In this disclosure, we discuss the challenge of timely verifying V2X safety messages. In particular, one goal is to ensure that V2X messages can be verified within tens of milliseconds, even though each vehicle may receive thousands of them per second. To this end, according to some embodiments, systems and methods of the disclosure provide or implement a mechanism or technique based on hash chaining that allows a large sequence of messages from the same source to be validated by verifying a single digital signature. Theoretical and experimental analyses show that, by including a single hash value each safety message, the expected savings can be on the order of 90% for very reliable communication channels, and remain higher than 65% when the maximum packet loss rate is 20%. It is also show that, for less reliable channels, additional hashes can be inserted in each message to provide similar processing savings. This hash chaining technique or mechanism of the present disclosure can be further combined with other mechanisms intended for alleviating the load of V2X message validation, such as prioritization and batch signature verification to efficiently handle messages from different sources.

The embodiments described above illustrate but do not limit the invention. For example, the techniques described for vehicles can be used by other mobile systems, e.g., pedestrians' smartphones or other mobile systems equipped with computer and communication systems 150. The term "vehicle" is not limited to terrestrial vehicles, but includes aircraft, boats, space ships, and maybe other types of mobile objects. The vehicle techniques can be also be used by non-mobile systems, e.g., they can be used on a computer system.

This description and the accompanying drawings that illustrate inventive aspects, embodiments, implementations, or applications should not be taken as limiting. Various mechanical, compositional, structural, electrical, and operational changes may be made without departing from the spirit and scope of this description and the claims. In some instances, well-known circuits, structures, or techniques have not been shown or described in detail in order not to obscure the embodiments of this disclosure. Like numbers in two or more figures typically represent the same or similar elements.

In this description, specific details are set forth describing some embodiments consistent with the present disclosure. Numerous specific details are set forth in order to provide a thorough understanding of the embodiments. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

Although illustrative embodiments have been shown and described, a wide range of modification, change and substitution is contemplated in the foregoing disclosure and in some instances, some features of the embodiments may be employed without a corresponding use of other features. One of ordinary skill in the art would recognize many variations, alternatives, and modifications. Thus, the scope of the invention should be limited only by the following claims, and it is appropriate that the claims be construed broadly and in a manner consistent with the scope of the embodiments disclosed herein.

The invention claimed is:

1. A method performed in an environment where a vehicle communicate with one or more other entities, each such entity being a potential source for one or more messages, wherein the one or more other entities comprise at least one of another vehicle, a roadside equipment unit, or a pedestrian, the method comprising:
   receiving by the vehicle over an interval of time a sequence of messages from the same source, each message comprising a payload, at least one hash value of a preceding message, and a message signature generated from the payload and the at least one hash value of a preceding message;
   in response to a triggering event comprising a safety situation for the vehicle, verifying the sequence of messages by:
      directly verifying the last message in the sequence by validating the signature of the last message; and
      indirectly verifying the remaining messages in the sequence performing a hash function on the second to the last message to generate a resulting hash value and comparing the resulting hash value against the hash value contained in the last message.

2. The method of claim 1, comprising generating a queue for the sequence of messages.

3. The method of claim 2, wherein the messages in the queue are organized according to the time at which each message was received by the vehicle.

4. The method of claim 3, comprising obtaining a private key for the source entity.

5. The method of claim 1, comprising generating a map of the sequence of messages.

6. The method of claim 5, wherein generating a map of the sequence of messages comprises organizing the received messages according to source entity.

7. The method of claim 1, comprising outputting the verified messages for use by the vehicle.

8. A system operating in an environment where a vehicle can communicate with one or more other entities, each such entity being a potential source for one or more messages, wherein the one or more other entities comprise at least one of another vehicle, a roadside equipment unit, or a pedestrian, the system comprising:
   one or more processors and computer memory at a vehicle, wherein the computer memory stores program instructions that when run on the one or more processors cause the vehicle to:

receive over an interval of time a sequence of messages from the same source, each message comprising a payload, at least one hash value of a preceding message, and a message signature generated from the payload and the at least one hash value of a preceding message;

in response to a triggering event comprising a safety situation for the vehicle, verifying the sequence of messages by:
  directly verifying the last message in the sequence by validating the signature of the last message; and
  indirectly verifying the remaining messages in the sequence performing a hash function on the second to the last message to generate a resulting hash value and comparing the resulting hash value against the hash value contained in the last message.

9. The system of claim 8, wherein the program instructions further cause the vehicle to generate a queue for the sequence of messages.

10. The system of claim 9, wherein the messages in the queue are organized according to the time at which each message was received by the vehicle.

11. The system of claim 8, wherein the program instructions further cause the vehicle to generate a map of the sequence of messages.

12. The system of claim 11, wherein generating a map comprises organizing the received messages according to source entity.

13. The system of claim 8, wherein the program instructions further cause the vehicle to output the verified messages for use by the vehicle.

* * * * *